(12) United States Patent
Zhao et al.

(10) Patent No.: US 12,524,992 B2
(45) Date of Patent: Jan. 13, 2026

(54) IMAGE CLASSIFICATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Yu Zhao, Shenzhen (CN); Zhenyu Lin, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 283 days.

(21) Appl. No.: 18/198,165

(22) Filed: May 16, 2023

(65) Prior Publication Data
US 2023/0290120 A1   Sep. 14, 2023

Related U.S. Application Data

(63) Continuation of application No. PCT/CN2022/129702, filed on Nov. 4, 2022.

(30) Foreign Application Priority Data

Dec. 22, 2021   (CN) .......................... 202111583275.9

(51) Int. Cl.
*G06K 9/00* (2022.01)
*G06V 10/26* (2022.01)
(Continued)

(52) U.S. Cl.
CPC ............ *G06V 10/764* (2022.01); *G06V 10/26* (2022.01); *G06V 10/44* (2022.01); *G06V 2201/03* (2022.01)

(58) Field of Classification Search
CPC ......... G06T 7/0012; G06T 2207/20084; G06T 2207/20081; G06T 2207/10081;
(Continued)

(56) References Cited

U.S. PATENT DOCUMENTS

2021/0065367 A1   3/2021   Liu et al.

FOREIGN PATENT DOCUMENTS

| CN | 111444365 A | 7/2020 |
|---|---|---|
| CN | 112036260 A | 12/2020 |

(Continued)

OTHER PUBLICATIONS

Ye al et. "Improving Histopathological Image Segmentation and Classification using Graph Convolution Network" ICCPR '19, Oct. 23-25, 2019, Beijing, China © 2019 Association for Computing Machinery (Year: 2019).*

(Continued)

*Primary Examiner* — Alex Kok S Liew
(74) *Attorney, Agent, or Firm* — Morgan, Lewis & Bockius LLP

(57) ABSTRACT

Disclosed are an image classification method performed by a computer device. The method includes: acquiring an image feature of a pathological image; extracting, for each scale in multiple scales, a local feature corresponding to the scale from the image feature; splicing the local features respectively corresponding to the scales to obtain a spliced image feature; and classifying the spliced image feature to obtain a category to which the pathological image belongs. According to the method provided in the embodiments of this application, the local features corresponding to different scales contain different information, so that the finally obtained spliced image feature contains feature information corresponding to different scales, and the feature information of the spliced image feature is enriched. The category to
(Continued)

which the pathological image belongs is determined based on the spliced image feature, so that the accuracy of the category is ensured.

15 Claims, 7 Drawing Sheets

(51) Int. Cl.
*G06V 10/44* (2022.01)
*G06V 10/764* (2022.01)

(58) Field of Classification Search
CPC ............ G06T 7/11; G06T 2207/10088; G06T 2207/30096; G06T 2207/10132; G06T 2207/30016; G06T 2207/30004; G06T 2207/10104; G06T 2207/20016; G06T 2207/30064; G06T 2207/10116; G06T 15/08; G06T 2207/20076; G06T 2200/04; G06T 2207/10072; G06T 2207/20021; G06T 2207/30061; G06T 11/006; G06T 11/008; G06T 2207/30012; G06N 3/045; G06N 3/08; G06N 3/084; G06N 3/04; G06N 3/048; G06N 3/044; G06N 7/01; G06N 5/046; G06N 20/00; G06N 3/047; G06N 3/0464; G06N 3/088; G06N 3/02; G06N 3/0455
See application file for complete search history.

(56) References Cited

FOREIGN PATENT DOCUMENTS

| | | |
|---|---|---|
| CN | 112257728 A | 1/2021 |
| CN | 113506310 A | 10/2021 |
| CN | 113743186 A | 12/2021 |
| CN | 114332530 A | 1/2022 |
| WO | WO 2021218469 A1 | 11/2021 |

OTHER PUBLICATIONS

Tencent Technology, Extended European Search Report, EP Patent Application No. 22909548.4, Feb. 28, 2025, 9 pgs.
Shuhao Qiu et al., "Attention Based Multi-Instance Thyroid Cytopathological Diagnosis with Multi-Scale Feature Fusion", 2020 25th International Conference on Pattern Recognition (ICPR), Jan. 2021, 6 pgs.
Ying Wang et al., "Pathological Image Classification Based on Hard Example Guided CNN", IEEE Access (vol. 8), Jun. 2020, 10 pgs.
Zhenyuan Ning et al., "Multiscale Context-Cascaded Ensemble Framework (MsC2 EF): Application to Breast Histopathological Image", IEEE Access (vol. 7), Oct. 2019, 14 pgs.
Tencent Technology, ISR, PCT/CN2022/129702, Jan. 10, 2023, 3 pgs.
Tencent Technology, WO, PCT/CN2022/129702, Jan. 10, 2023, 4 pgs.
Tencent Technology, IPRP, PCT/CN2022/129702, Jun. 20, 2024, 5 pgs.

* cited by examiner

IMAGE CLASSIFICATION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/129702, entitled "IMAGE CLASSIFICATION METHOD AND APPARATUS, COMPUTER DEVICE, AND STORAGE MEDIUM" filed on Nov. 4, 2022, which claims priority to Chinese Patent Application No. 202111583275.9, entitled "IMAGE CLASSIFICATION METHOD AND APPARATUS, COMPUTER DEVICE, AND STORAGE MEDIUM" filed with China National Intellectual Property Administration on Dec. 22, 2021, all of which is incorporated by reference in its entirety.

FIELD OF THE TECHNOLOGY

Embodiments of this application relate to the field of computer technologies, and in particular, to an image classification method and apparatus, a computer device, and a storage medium.

BACKGROUND OF THE DISCLOSURE

With the development of computer technologies, the image classification technology is applied more widely, and may be applied to various scenarios such as a face recognition scenario and a medical image classification scenario. In the related technology, feature extraction is performed on a to-be-classified image to obtain an image feature of the image, and the image feature of the image is directly classified to obtain a category to which the image belongs. According to the foregoing method, the classification is directly performed according to the extracted image feature, and the amount of information in the image feature is small, resulting in poor classification accuracy.

SUMMARY

Embodiments of this application provide an image classification method and apparatus, a computer device, and a storage medium, which can improve the classification accuracy. The technical solutions will be described below.

In an aspect, an image classification method is performed by a computer device and includes:
  acquiring an image feature of a pathological image;
  extracting, for each scale in multiple scales, a local feature corresponding to the scale from the image feature;
  splicing the local features respectively corresponding to the scales to obtain a spliced image feature; and
  classifying the spliced image feature to obtain a category to which the pathological image belongs.

In another aspect, a computer device is provided, which includes a processor and a memory. The memory stores at least one computer program that, when loaded and executed by the processor, causes the computer device to implement operations performed in the image classification method according to the foregoing aspect.

In another aspect, a non-transitory computer-readable storage medium is provided, which stores at least one computer program that, when loaded and executed by a processor of a computer device, causes the computer device to implement operations performed in the image classification method according to the foregoing aspect.

According to the method, the apparatus, the computer device, and the storage medium that are provided in the embodiments of this application, after being acquired, an image feature of a pathological image is processed according to multiple scales respectively to obtain local features respectively corresponding to the multiple scales, and the local features respectively corresponding to the multiple scales are spliced to obtain a spliced image feature, and the spliced image feature is classified to obtain a category to which the pathological image belongs. The local features corresponding to different scales contain different information, so that the finally obtained spliced image feature contains feature information corresponding to different scales, and the feature information of the spliced image feature is enriched. The category to which the pathological image belongs is determined based on the spliced image feature, so that the accuracy of the category is ensured.

BRIEF DESCRIPTION OF THE DRAWINGS

In order to describe the technical solutions in the embodiments of this application, the drawings need to be used in the description of the embodiments will be briefly introduced below. Obviously, the drawings in the following description are only some embodiments of this application, and those of ordinary skill in the art may obtain other drawings according to these drawings without involving any inventive effort.

DESCRIPTION OF EMBODIMENTS

In order to make objectives, technical solutions, and advantages of the embodiments of this application clearer, implementations of this application will be further described in detail below with reference to the drawings.

The terms "first", "second", and the like used in this application may be used herein to describe various concepts, but unless otherwise specified, these concepts are not limited by these terms. The terms are merely used for distinguishing one concept from another concept. For example, without departing from the scope of this application, a first feature vector may be referred to as a second feature vector, and similarly, the second feature vector may be referred to as the first feature vector.

In the terms "at least one", "multiple", "each", and "any" used in this application, "at least one" includes one, or two or more, "multiple" includes two or more, and "each" refers to each of the corresponding plurality, and "any" refers to any one of the plurality. For example, multiple scales include 3 scales, "each" refers to each of the 3 scales, and "any" refers to any one of the 3 scales, which may be the first, or the second, or the third.

According to the solutions provided in the embodiments of this application, a classification model may be trained based on the artificial intelligent machine learning technology, and the trained classification model is used to realize the classification of a pathological image.

The embodiments of this application provide an image classification method, which is performed by a computer device. In a possible implementation, the computer device is a terminal or a server. In a possible implementation, the server is an independent physical server, or a server cluster or distributed system composed of multiple physical servers, or a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform. In a possible implementation, the terminal may include, but is not limited to, a smartphone, a tablet computer, a notebook computer, a desktop computer, a smart speaker, a smartwatch, a smart voice interaction device, a smart household appliance, an on-board terminal, and the like.

In some embodiments, a computer program involved in the embodiments of this application may be deployed to be executed on a computer device, or executed on multiple computer devices at the same location, or executed on multiple computer devices that are distributed at multiple locations and connected to each other through a communication network, and the multiple computer devices that are distributed at multiple locations and connected to each other through a communication network can form a blockchain system.

Figure 1:
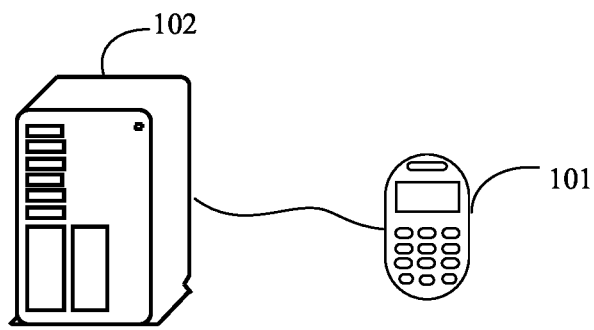
FIG. 1 is a schematic structural diagram of an implementation environment according to an embodiment of this application.

FIG. 1 is a schematic diagram of an implementation environment according to an embodiment of this application. Referring to FIG. 1, the implementation environment includes a terminal 101 and a server 102. The terminal 101 is directly or indirectly connected to the server 102 in a wired or wireless communication mode, which is not defined herein.

The terminal 101 is configured to acquire a pathological image and transmit the pathological image to the server 102. The server 102 is configured to classify the pathological image transmitted by the terminal 101 to obtain a category to which the pathological image belongs.

In some embodiments, a target application for which the server 102 provides a service is installed on the terminal 101, and the terminal 101 can realize functions, such as data transmission and message exchange, through the target application. In a possible implementation, the target application is a target application in an operating system of the terminal 101 or a target application provided by a third party. For example, the target application is an image classification application having an image classification function. Of course, the image classification application can have other functions such as a comment function and a navigation function.

The terminal 101 is configured to acquire a pathological image, log in the target application based on a user identifier, and transmit the pathological image to the server 102 through the target application. The server 102 is configured to receive the pathological image transmitted by the terminal 101, and classify the pathological image transmitted by the terminal 101 to obtain a category to which the pathological image belongs. In a possible implementation, the server 102 transmits a classification result to the terminal 101. The classification result is used for indicating the category to which the pathological image belongs. The terminal 101 receives and displays the classification result transmitted by the server 102.

Figure 2:
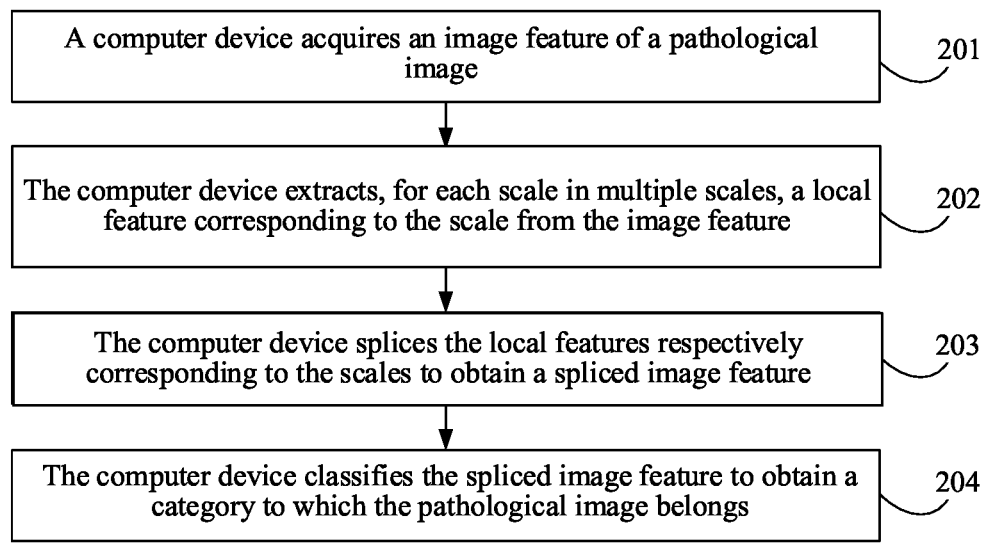
FIG. 2 is a flowchart of an image classification method according to an embodiment of this application.

FIG. 2 is a flowchart of an image classification method according to an embodiment of this application. As shown in FIG. 2, the method is performed by a computer device and includes the following steps.

201: The computer device acquires an image feature of a pathological image.

The pathological image is an image used for presenting the pathological morphology of a body organ, tissue or cell. For example, the pathological image is a whole slide image (WSI, a digital pathological image). The image feature of the pathological image is used for characterizing the pathological image, which is a two-dimensional feature or a three-dimensional feature and can be represented in any form. For example, the image feature is represented in the form of a feature matrix or a feature vector. For another example, the image feature is represented in the form of a three-dimensional feature matrix or a two-dimensional feature matrix.

202: The computer device extracts, for each scale in multiple scales, a local feature corresponding to the scale from the image feature.

The scale is used for characterizing a feature size of the local feature extracted from the image feature, and the multiple scales correspond to different sizes. For example, all the multiple scales are two-dimensional scales, which are 3×3, 5×5, and 7×7, respectively. Each local feature is a partial feature in the image feature, any local feature corresponding to any scale represents that a feature size of the local feature is matched with the scale, that is, the local feature is extracted from the image feature based on the scale. For any scale in the multiple scales, at least one local feature corresponding to the scale is extracted from the image feature.

203: The computer device splices the local features respectively corresponding to the scales to obtain a spliced image feature.

The local features corresponding to difference scales contain different information, and the local features of different scales are spliced, so that it is ensured that the spliced image feature contains feature information corresponding to the multiple scales.

In a possible implementation, when one scale corresponds to multiple local features, the method of splicing the local features respectively corresponding to the scales to obtain a spliced image feature may refer to that for multiple local features corresponding to each scale, the multiple local features corresponding to the scale are aggregated to obtain an aggregated feature, and the multiple aggregated features are spliced to obtain a spliced image feature.

204: The computer device classifies the spliced image feature to obtain a category to which the pathological image belongs.

According to the method, the apparatus, the computer device, and the storage medium that are provided in the embodiments of this application, after being acquired, an image feature of a pathological image is processed according to multiple scales respectively to obtain local features respectively corresponding to the multiple scales, and the local features respectively corresponding to the multiple scales are spliced to obtain a spliced image feature, and the spliced image feature is classified to obtain a category to which the pathological image belongs. The local features corresponding to different scales contain different information, so that the finally obtained spliced image feature contains feature information corresponding to different scales, and the feature information of the spliced image feature is enriched. The category to which the pathological image belongs is determined based on the spliced image feature, so that the accuracy of the category is ensured.

Based on the embodiment shown in FIG. 2, the image feature of the pathological image can also be acquired by a method of first segmenting and then splicing; and multiple aggregated features are acquired by the self-attention mechanism, an acquired spliced image feature is updated, and the category to which the pathological image belongs is acquired based on the updated spliced image feature, which will be specifically described in the following embodiment.

Figure 3:
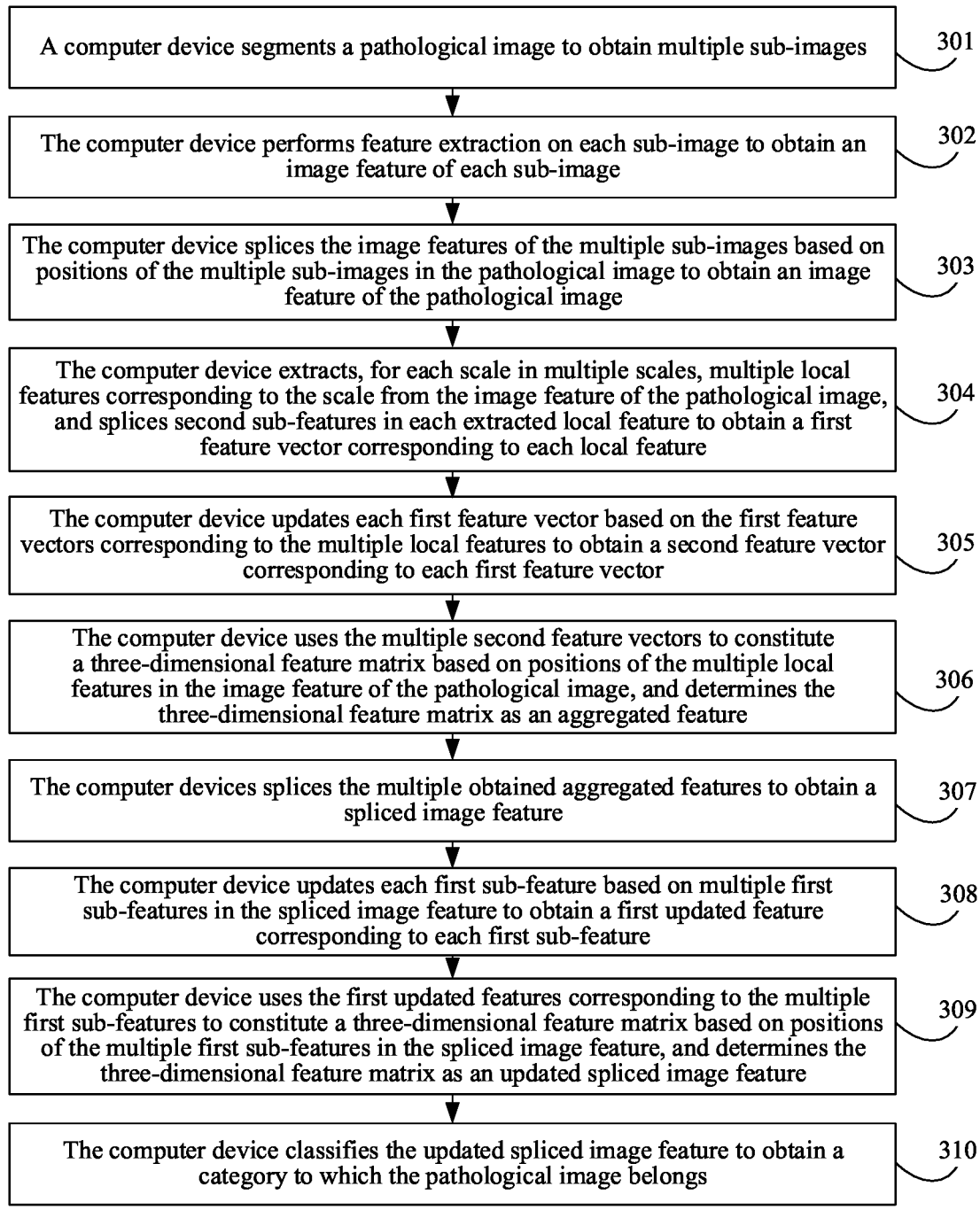
FIG. 3 is a flowchart of another image classification method according to an embodiment of this application.

FIG. 3 is a flowchart of another image classification method according to an embodiment of this application. As shown in FIG. 3, the method is performed by a computer device and includes the following steps.

301: The computer device segments a pathological image to obtain multiple sub-images.

Each sub-image is a partial image in the pathological image, and the multiple sub-images can form the pathological image. In a possible implementation, the multiple sub-images have the same image size. For example, an image size of the pathological image is 40000×40000, a size of each sub-image is 4000×4000, so the pathological image is segmented into 100 sub-images.

In a possible implementation, step 301 includes the following sub-step: the pathological image is segmented based on a preset size to obtain multiple sub-images. A size of each sub-image is the same as the preset size. For example, the preset size is 1120×1120, and the size of each sub-image obtained by segmentation is 1120×1120.

In a possible implementation, the process of segmenting the pathological image includes the following steps: a first sliding window is moved on the pathological image based on a first moving step length, and a partial pathological image within the first sliding window after each movement is determined as one sub-image.

A size of the first sliding window is the same as the preset size, and the first moving step length represents a movement distance of the first sliding window during each movement. For example, the first moving step length represents a quantity of pixels moved each time during movement of the first sliding window. In a possible implementation, the preset size includes a first size and a second size, the first size and the second size respectively represent a length and a width of the first sliding window, and the first moving step length is the same as the first size and the second size. For example, the present size is 1120×1120, the first moving step length is 1120, multiple sub-images in the pathological image are obtained based on the first moving step length and the preset size, and a size of each sub-image is 1120×1120.

In a possible implementation, the pathological image is represented in the form of a three-dimensional feature matrix, the sub-images obtained by segmentation are also represented in the form of three-dimensional feature matrices, the multiple sub-images can be spliced into the pathological image, and the pathological image and the multiple sub-images satisfy the following relationship:

$$B = \{p^{0,0}, p^{r,c}, \ldots, p^{H',W'}\}$$

$$B = \in R^{H \times W \times 3}$$

$$p^{0,0}, p^{r,c}, p^{H',W'} \in R^{T_h \times T_w \times 3}$$

$$H' = \frac{H}{T_h}; W' = \frac{H}{T_w}$$

where, B represents the pathological image, B∈ $R^{H \times W \times 3}$ indicates that the image size of the pathological image is H×W×3, H and W represent a length and a width of the pathological image, and H and W are any positive integer; $p^{0,0}$, $p^{r,c}$, and $p^{H',W'}$ all represent one sub-image in the multiple sub-images, $p^{0,0}$, $p^{r,c}$, $p^{H',W'} \in R^{T_h \times T_w \times 3}$ indicates that the image size of each sub-image is $T_h \times T_w \times 3$, $T_h$ and $T_w$ represent a length and a width of each sub-image, $T_h$ and $T_w$ are both any positive integer, $T_h$ is less than H, and $T_w$ is less than W; r, c represents the serial number of the multiple sub-image, r is an integer greater than 0 but not greater than H', and c is a positive integer greater than 0 but not greater than W'; and H' is a quantity of sub-images that are segmented from the pathological image with the image size of H according to the image size of $T_h$, W' is a quantity of sub-images that are segmented from the pathological image with the image size of W according to the image size of $T_w$, and H'×W' is a total quantity of sub-images that are segmented from the pathological image.

302: The computer device performs feature extraction on each sub-image to obtain an image feature of each sub-image.

The image feature of each sub-image is used for characterizing the corresponding sub-image, which is a two-dimensional feature or a three-dimensional feature and can be represented in any form. For example, the image feature of the sub-image is presented in the form of a feature vector or a feature matrix. For another example, the image feature of the sub-image is presented in the form of a two-dimensional feature matrix or a three-dimensional feature matrix.

In a possible implementation, each sub-image and the corresponding image feature satisfy the following relationship:

$$e^{r,c} = f_E(p^{r,c}) \in R^D$$

where, $e^{r,c}$ any sub-image in the multiple sub-images, r, c represents the serial number of the multiple sub-images, and $p^{r,c}$ represents a (r,c)$^{th}$ sub-image in the multiple sub-images; $f_E(\cdot)$ represents a feature extraction function, and feature extraction can be performed on each sub-image based on the feature extraction function $f_E(\cdot)$ to obtain the image feature of each sub-image; and $e^{r,c} \in R^D$ represents that the image feature $e^{r,c}$ is a feature vector with a dimension of D.

303: The computer device splices the image features of the multiple sub-images based on positions of the multiple sub-images in the pathological image to obtain an image feature of the pathological image.

The image feature of the pathological image is used for characterizing the pathological image, which can be represented in any form. For example, all the image features of the multiple sub-images are two-dimensional feature matrices, and the image feature of the pathological image is also a two-dimensional feature matrix; and all the image features of the multiple sub-images are three-dimensional feature matrices, and the image feature of the pathological image is also a three-dimensional feature matrix.

The positions of different sub-images in the pathological image are different, and the image features of the multiple sub-images are spliced based on the position of each sub-image in the pathological image to obtain the image feature of the pathological image, so that the image feature of the pathological image corresponds to the pathological image. The image feature of the pathological image retains position information of the sub-images, so that the accuracy of the image feature is ensured. Moreover, first the pathological image is segmented into multiple sub-images with a small size, an image feature of each sub-image is acquired, and the image features of the multiple sub-images are spliced into an image feature of the pathological image. In this way, it is unnecessary to directly perform feature extraction on the pathological image with a large size, so that the requirements for the performance of the device are reduced. The requirements for the device configured to classify an image are reduced, so that the universality of the feature extraction method is ensured.

In a possible implementation, when all the image features of the multiple sub-images are two-dimensional feature matrices, a feature size of the image feature of the pathological image is the sum of feature sizes of the image features of the multiple sub-images. For example, the pathological image includes 4 sub-images, the feature size of the image feature of each sub-image is 2×2, and the feature size of the image feature of the pathological image is 8×8.

In a possible implementation, when all the image features of the multiple sub-images are three-dimensional feature matrices, the feature size of the image feature of the sub-image includes a first size, a second size, and a third size, the feature size of the image feature of the pathological image includes a fourth size, a fifth size, and a sixth size, the fourth size is the sum of the first sizes corresponding to the multiple sub-images, the fifth size is the sum of the second sizes corresponding to the multiple sub-images, and the sixth size is the same as the third size. For example, the pathological image includes 4 sub-images, the feature size of the image feature of each sub-image is 2×2×10, and the feature size of the image feature of the pathological image is 8×8×10.

In a possible implementation, the image features of the multiple sub-images and the image feature of the pathological image satisfy the following relationship:

$$E=(e^{0,0}, e^{r,c}, \ldots, e^{H',W'}) \in R^{W' \times H' \times D}$$

where, E represents the image feature of the pathological image, and $e^{0,0}$, $e^{r,c}$, and $e^{H',W'}$ all represent an image feature of one sub-image in the multiple sub-images; r, c represents the serial number of the multiple sub-images, r is an integer greater than 0 but not greater than H', and c is a positive integer greater than 0 but not greater than W'; H' is a quantity of sub-images that are segmented from the pathological image in a dimension of H dimension according to a feature size $T_h$, W' is a quantity of sub-images that are segmented from the pathological image in a dimension of W according to a feature size $T_w$, and H'×W' represents a total quantity of sub-images that are segmented from the pathological image; and D represents a vector dimension of the image feature of each sub-image when the image feature of each sub-image is a vector.

In the embodiments of this application, the method of first segmenting and then splicing is adopted, that is, a pathological image is segmented into multiple sub-images, and an image feature of the pathological image is acquired based on the multiple sub-images. However, in another embodiment, it is unnecessary to perform steps 301 to 303, and another method can be adopted to acquire the image feature of the pathological image.

304: The computer device extracts, for each scale in multiple scales, multiple local features corresponding to the scale from the image feature of the pathological image, and splices second sub-features in each extracted local feature to obtain a first feature vector corresponding to each local feature.

In the embodiments of this application, the image feature of the pathological image includes second sub-features at multiple positions, which are one-dimensional features or two-dimensional features. For example, the second sub-feature includes one feature value, or, the second sub-feature is a feature vector composed of multiple feature values. When the image feature of the pathological image is a two-dimensional feature, the second sub-feature includes one feature value; and when the image feature of the pathological image is a three-dimensional feature, the second sub-feature includes multiple feature values, that is, the second sub-feature is a feature vector composed of the multiple feature values. For example, the feature size of the image feature of the pathological image is 3×3×10, the image feature includes second sub-features at 9 positions, and each second sub-feature is a feature vector composed of 10 feature values.

Figure 4:
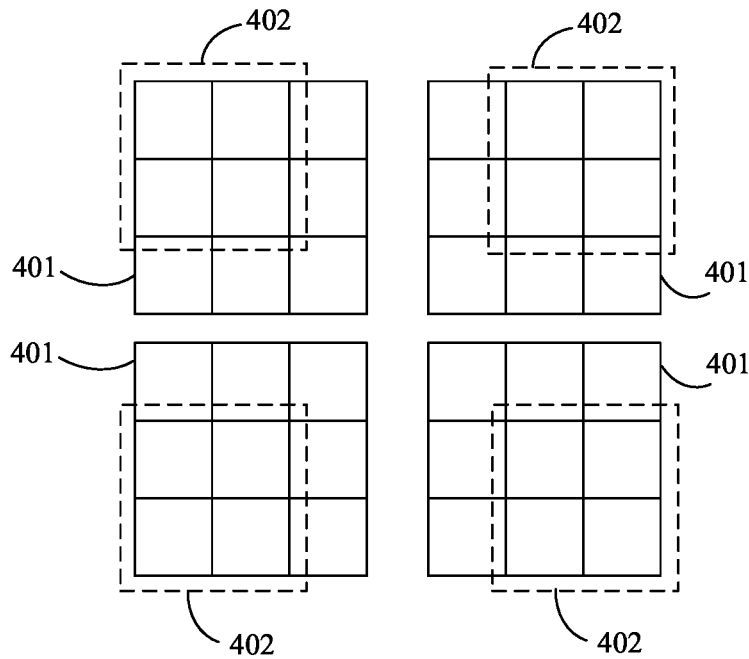
FIG. 4 is a schematic diagram of extraction of a local feature according to an embodiment of this application.

For any scale in the multiple scales, at least one local feature is extracted from the image feature of the pathological image based on the scale, and each local feature includes a second sub-feature at at least one position. In a possible implementation, any scale corresponds to multiple local features, each local feature includes second sub-features at multiple positions, and different local features may include the same second sub-feature. The image feature of the pathological image includes second sub-features at 3×3 positions, and as shown in FIG. 4, each block corresponds to one position. A scale is 2×2, 4 local features 402 are extracted from an image feature 401 of a pathological image based on the scale, and each local feature 402 includes second sub-features at 4 positions. That is, in the image feature of the pathological image, second sub-features at 4 positions in the upper left corner constitute one local feature 402, second sub-features at four positions in the upper right corner constitute one local feature 402, second sub-features at four positions in the lower left corner constitute one local feature 402, second sub-features at four positions in the lower right corner constitute one local feature 402, and the local feature 402 in the upper left corner and the local feature 402 in the upper right corner include two identical second sub-features.

For any local feature, the second sub-features in the local feature are spliced into one first feature vector, and a feature size of the first feature vector is the sum of feature sizes of at least one second sub-feature in the local feature. For example, any local feature includes 4 second sub-features, a feature size of each second sub-feature is 1×3, the 4 second sub-features are spliced into one first feature vector, and a size of the first feature vector corresponding to the local feature is 1×12.

In a possible implementation, the process of extracting, for any scale, a local feature corresponding to the scale includes the following steps: a second sliding window corresponding to the scale is moved on the image feature of the pathological image based on a second moving step length, and a second sub-feature at at least one position within the second sliding window is used to constitute one local feature.

A size of the second sliding window corresponding to the scale is the same as the scale. In a possible implementation, the scale is a side length of the second sliding window. For example, the scale is a one-dimensional scale, and a length and a width of the second sliding window are the same as the scale. If the scale is 3, the size of the second sliding window is 3×3. For another example, the scale is a two-dimensional scale including a length and a width, and a length and a width of the second sliding window corresponding to the scale are respectively the same as the length and the width of the two-dimensional scale. The second moving step length represents a distance of the second sliding window during each movement. For example, the second moving step length represents a quantity of positions moved each time during movement of the second sliding window. For example, the second moving step length is 1, that is, the second sliding window is moved by one position during each movement. As shown in FIG. 4, the size of the second sliding window is 2×2, the second moving step length is 1, and the second sub-features at the 4 positions that are included in each local feature 402 are extracted.

In a possible implementation, the processing of extracting a local feature corresponding to any scale includes the following steps: an expansion parameter corresponding to a scale is determined, the image feature of the pathological image is expanded based on the expansion parameter to obtain an expanded image feature, a second sliding window corresponding to the scale is moved on the image feature of the pathological image based on the second moving step length, and a second sub-feature at at least one position within the second sliding window after each movement is used to constitute one local feature.

The expansion parameter is used for indicating a quantity of positions in the expanded image feature of the pathological image. For example, the expansion parameter is Padding. For the expansion parameter corresponding to any scale, the image feature of the pathological image is expanded to the quantity of positions indicated by the expansion parameter, so that a feature size of an expanded image feature becomes larger. For example, after the image feature of pathological image is expanded, a length and a width in the feature size of the expanded image feature are both expanded by 2 times based on the quantity of positions indicated by the expansion parameter. For example, the image feature of the pathological image is a 3×3 feature matrix, the expansion parameter corresponding to any scale is 1, and the expanded image feature is a 5×5 feature matrix; and the expansion parameter corresponding to any scale is 2, and the expanded image feature is a 7×7 feature matrix.

In a possible implementation, any scale is a one-dimensional scale, and the process of determining an expansion parameter corresponding to the scale includes the following steps: a difference between the scale and a first numerical value is determined, and a ratio of the difference to a second numerical value is determined as an expansion parameter corresponding to the scale.

Both the first numerical value and the second numerical value are any numerical value. For example, the first numerical value is 1, and the second numerical value is 2.

In a possible implementation, any scale and the expansion parameter corresponding to the scale satisfy the following relationship:

$$\beta = \frac{k-1}{2}$$

where, k represents the scale, $\beta$ represents the expansion parameter corresponding to the scale k, and in the embodiments of this application, the first numerical value is 1, and the second numerical value is 2.

For example, the feature size of the image feature of the pathological image is 4×4, a first scale is 3, that is, a size of a second sliding window corresponding to the first scale is 3×3, a first expansion parameter corresponding to the first scale is 1, that is, a feature size of an image feature expanded based on the first expansion parameter is 6×6, and 16 local features with a feature size of 3×3 can be extracted based on the second sliding window corresponding to the first scale. A second scale is 5, that is, a size of a second sliding window corresponding to the second scale is 5×5, a second expansion parameter corresponding to the second scale is 2, that is, a feature size of an image feature expanded based on the second expansion parameter is 8×8, and 16 local features with a feature size of 5×5 can be extracted based on the second sliding window corresponding to the second scale. That is, 16 local features are extracted based on the first scale or the second scale.

When the local feature is extracted from the image feature of the pathological image based on each scale, the image feature of the pathological image is first expanded based on the expansion parameter corresponding to each scale to ensure that quantities of local features extracted based on the scales are consistent, which facilitates the subsequent feature fusion based on the multiple scales.

In a possible implementation, for any scale in the multiple scales, when a first feature vector that corresponds to each local feature corresponding to the scale is obtained, the multiple first feature vectors are used to constitute a first feature matrix corresponding to the scale.

In a possible implementation, for any scale in the multiple scales, the first feature matrix corresponding to the scale and the image feature of the pathological image satisfy the following relationship:

$$T = \text{SoftSplit}(E) = \text{Concat}(\text{Unfold}(E))$$

$$T \in R^{H''W'' \times k^2 D}$$

$$H'' = \left[\frac{H' + 2\beta - k}{\alpha} + 1\right]; W'' = \left[\frac{W' + 2\beta - k}{\alpha} + 1\right]; \beta = \frac{k-1}{2}$$

where, T represents the first feature matrix corresponding to the scale; E represents the image feature of the pathological image, and SoftSplit(·) represents a feature reconstruction function used for constituting the first feature matrix according to the image feature E of the pathological image; Concat(·) represents a splicing function used for constituting the first feature matrix corresponding to the scale according to the multiple first feature vectors; Unfold(·) represents a spread function used for splicing the second sub-features in the local feature corresponding to the scale into one first feature vector; $T \in R^{H''W'' \times k^2 D}$ represents that a size of the first feature matrix corresponding to the scale is $H''W'' \times k^2 D$, k represents the scale, and k is a positive integer; a feature size of each local feature corresponding to the scale k is k×k; a feature size of the image feature of the pathological image is W'×H'×D, W' and H' represents a length and a width of the image feature of the pathological image, D represents a dimension of each second sub-feature in the image feature of the pathological image, and W', H', and D are all positive integers; H" represents a quantity for dividing the dimension H' of the image feature of the pathological image when the local features are extracted from the image feature of the pathological image according to the scale k; W" represents a quantity for dividing the dimension W' of the image feature of the pathological image when the local features are extracted from the image feature of the pathological image according to the scale k; D represents a vector dimension of each second sub-feature; $k^2D$ represents a vector dimension of each first feature vector; H"W" represents a quantity of multiple local features corresponding to the scale k, and also represents a quantity of multiple first feature vectors corresponding to the scale k; β represents an expansion parameter corresponding to the scale k; and α represents the second moving step length.

305: The computer device updates each first feature vector based on the first feature vectors corresponding to the multiple local features to obtain a second feature vector corresponding to each first feature vector.

In the embodiments of this application, for any scale in the multiple scales, the scale corresponds to multiple local features. In view of the correlation between different local feature, after the first feature vectors corresponding to the multiple local features are acquired, each first feature vector is updated through the first feature vectors corresponding to the multiple local features, so that a second feature vector obtained by updating is fused with the first feature vectors corresponding to other local features, and the accuracy of the second feature vector is ensured.

In a possible implementation, step 305 includes the following sub-step: for a feature vector in the multiple first feature vectors, the similarity between each first feature vector and the feature vector is obtained, and the multiple first feature vectors are weighted and fused based on the similarity corresponding to each first feature vector to obtain a second feature vector corresponding to the feature vector.

The feature vector is any first feature vector in the multiple first feature vectors. The similarity between any first feature vector and the feature vector represents a level of similarity between the first feature vector and the feature vector, which can be acquired by a method of acquiring a cosine similarity or other similarities. The similarity corresponding to each first feature vector can represent a level of similarity between the first feature vector and the feature vector, and the multiple first feature vectors are weighted and fused by the self-attention mechanism based on the similarities between the multiple first feature vectors and the feature vector to obtain a second feature vector corresponding to the feature vector, so that the second feature vector is fused with the multiple first feature vectors according to the similarities corresponding to the first feature vectors, and the accuracy of the obtained second feature vector is ensured. According to the foregoing method of acquiring the second feature vector corresponding to the feature vector, a second feature vector corresponding to each first feature vector may be acquired.

In a possible implementation, the process of acquiring the second feature vector corresponding to the feature vector includes the following steps: for the feature vector of the multiple first feature vectors, the similarity between each first feature vector and the feature vector, the multiple first feature vectors are weighted and fused based on the similarity corresponding to each first feature vector to obtain a third feature vector, and feature transformation is performed on the third feature vector to obtain the second feature vector corresponding to the feature vector.

In the embodiments of this application, feature dimensions of each first feature vector and the corresponding second feature vector are different. For each scale in the multiple scales, feature dimensions of second feature vectors corresponding to different scales are the same. In the process of updating the multiple first feature vectors corresponding to each scale, the feature vectors are transformed into feature vectors with the same feature dimension, which ensures that feature sizes of aggregated features subsequently obtained based on each scale are the same.

In a possible implementation, the process of performing feature transformation on the third feature vector includes the following steps: a product of the third feature vector and a feature transformation matrix is determined as the second feature vector corresponding to the target feature vector.

The feature transformation matrix is used for transforming the third feature vector and is any constant matrix.

In a possible implementation, for any scale in the multiple scales, the first feature vectors that correspond to each local feature corresponding to the scale constitute the first feature matrix corresponding to the scale, and step 305 includes the following sub-steps: each first feature vector in the first feature matrix is updated based on the multiple first feature vectors in the first feature matrix to obtain a second feature vector corresponding to each first feature vector, and the multiple second feature vectors are used to constitute a second feature matrix.

In a possible implementation, for any scale in the multiple scales, the first feature matrix and the second feature matrix corresponding to the scale satisfy the following relationship:

$$T' = \text{MLP}(\text{MSA}(T)) \in R^{H''W'' \times d_z}$$

$$\text{MSA}(T) = \text{Concat}(H_1, \ldots, H_w, \ldots, H_\Omega)W^O$$

$$H_w = A(T, W_w^Q, W_w^K, W_w^V)$$

$$W^O = R^{\Omega k^2 D \times d_w}$$

where, T' represents the second feature matrix corresponding to the scale; MLP(·) represents a multi-layer perception function used for performing fully connected transformation on a feature; MSA(·) represents a multi-head self-attention function; T represents the first feature matrix corresponding to the scale; a feature size of the image feature of the pathological image is W'×H'×D, W' and H' represents a length and a width of the image feature of the pathological image, D represents a dimension of each second sub-feature in the image feature of the pathological image, and W', H', and D are all positive integers; H" represents a quantity for dividing the dimension H' of the image feature of the pathological image when the local features are extracted from the image feature of the pathological image according to the scale; W" represents a quantity for dividing the dimension W' of the image feature of the pathological image when the local features are extracted from the image feature of the pathological image according to the scale; H"W" represents a quantity of multiple local features corresponding to a scale k, that is, a quantity of multiple second feature vectors; $d_z$ represents a vector dimension of each second feature vector; Concat(·) represents a connection function; Ω represents a quantity of heads in the multi-head self-attention function, and Z is a positive integer greater than 1; $H_w$ represents a feature outputted by any head in the multi-head self-attention function, w represents the serial number of each head self-attention in the multi-head self-attention function, and w is a positive integer greater than 0 but not greater than Ω; $W^O$ represents a mapping matrix that is a constant matrix; $W_w^Q$, $W_w^K$, and $W_w^V$ are all constant matrices in a $w^{th}$ head self-attention function; A(·) represents the $w^{th}$ head self-attention function in the multi-head self-attention function; and $k^2D$ represents a vector dimension of each first feature vector in the first feature matrix corresponding to the scale.

306: The computer device uses the multiple second feature vectors to constitute a three-dimensional feature matrix based on positions of the multiple local features in the image feature of the pathological image, and determines the three-dimensional feature matrix as an aggregated feature.

Positions of different local features in the image feature of the pathological image are different. The second feature vector corresponding to any local feature is a feature of a pixel of a position, corresponding to the local feature, in the pathological image. In a possible implementation, the second feature vector corresponding to any local feature is a feature of one or more pixels, corresponding to the local feature, in the pathological image. For example, the image feature of the pathological image is used for characterizing the pathological image, any local feature in the pathological image is a feature of a pixel in a partial region of the pathological image, there is one or more pixels in the partial region of the pathological image, and the second feature vector corresponding to the local feature is a feature of one or more pixels in the partial region of the pathological image.

According to the positions of the multiple local features in the image feature of the pathological image, the second feature vectors corresponding to the multiple local features are used to constitute one three-dimensional feature matrix, that is, one aggregated feature. For example, 4 local features correspond to any scale, a dimension of a second feature vector corresponding to each local feature is 10, and a feature size of an aggregated feature constituted based on the second feature vectors corresponding to the multiple local features is 2×2×10. According to the foregoing methods in steps 304 to 306, the image feature of the pathological image is processed based on the multiple scales to obtain multiple aggregated features.

In the process of processing the image feature of the pathological image based on each scale, the second sub-features in each local feature are spliced into one feature vector. In view of the correlation between different local features, each first feature vector is updated through the first feature vectors corresponding to the multiple local features, so that the second feature vector obtained by updating is fused with the first feature vectors corresponding to other local features, and the accuracy of the second feature vector is ensured. Moreover, the three-dimensional feature matrix that is constituted by the feature vectors corresponding to the multiple local features according to the positions of the multiple local features in the image feature of the pathological image is determined as the aggregated feature, so that the aggregated feature retains position information of the multiple local features in the image feature of the pathological image, and the accuracy of the aggregated feature is ensured.

In a possible implementation, quantities of multiple local features corresponding to different scales are the same, feature dimensions of second feature vectors corresponding to different scales are the same, and feature sizes of aggregated features acquired based on different scales are the same.

In a possible implementation, for any scale in the multiple scales, the multiple second feature vectors corresponding to the scale are used to constitute the second feature matrix, and step 306 includes the following sub-steps: the multiple second feature vectors in the second feature matrix are used to constitute a three-dimensional feature matrix based on the positions of the multiple local features in the image feature of the pathological image, and the three-dimensional feature matrix is determined as the aggregated feature.

In a possible implementation, the second feature matrix and the aggregated feature satisfy the following relationship:

$$E' = \text{Reshape}(T') \in R^{H'' \times W'' \times d_z}$$

where, E' represents the aggregated feature obtained based on the scale; Reshape(·) represents a remodeling function used for remodeling the second feature matrix to recover spatial position information so as to obtain a new feature map; $E' \in R^{H'' \times W'' \times d_z}$ represents a feature size of the aggregated feature E'; a feature size of the image feature of the pathological image is W'×H'×D, W' and H' represents a length and a width of the image feature of the pathological image, D represents a dimension of each second sub-feature in the image feature of the pathological image, and W', H', and D are all positive integers; H" represents a quantity for dividing the dimension H' of the image feature of the pathological image when the local features are extracted from the image feature of the pathological image according to the scale; W" represents a quantity for dividing the dimension W' of the image feature of the pathological image when the local features are extracted from the image feature of the pathological image according to the scale; and $d_z$ represents a vector dimension of each second feature vector.

Figure 5:
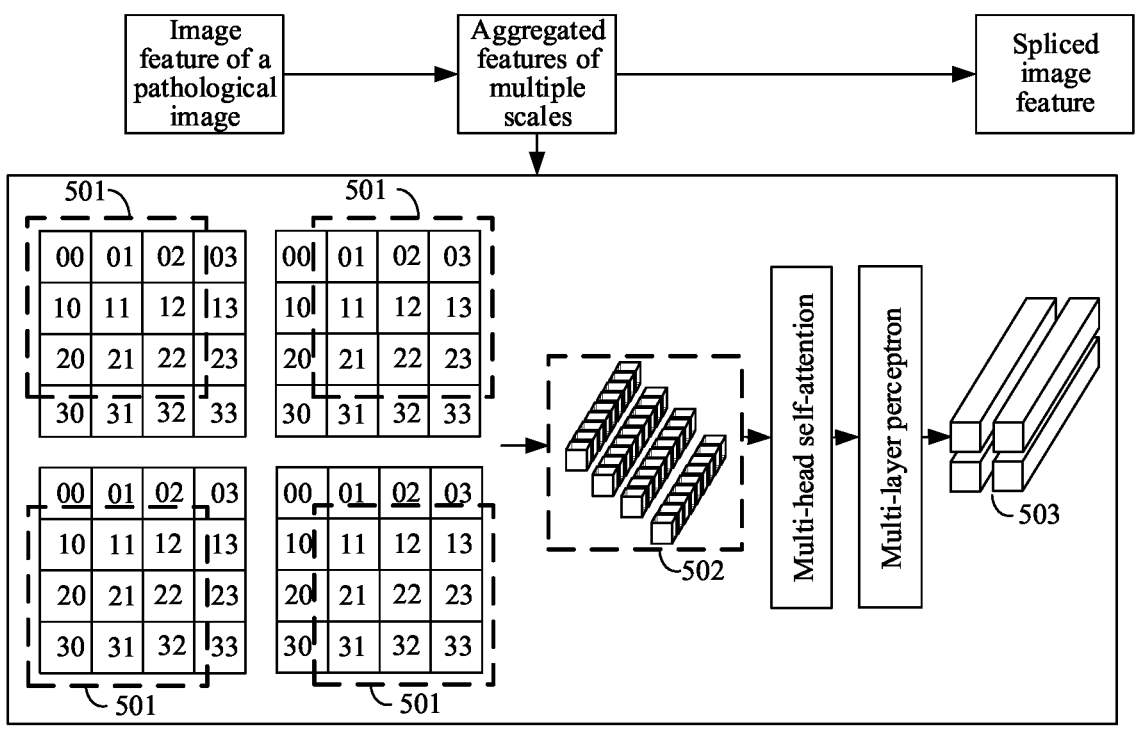
FIG. 5 is a flowchart of acquisition of any aggregated feature according to an embodiment of this application.

In the process of acquiring the aggregated feature based on any scale, as shown in FIG. 5, a case where the image feature of the pathological image is a 4×4 matrix, any scale is 3, 4 local features 501 are extracted from the image feature of the pathological image, each local feature 501 is fused into one first feature vector 502, each first feature vector is updated by the multi-head attention mechanism and a multi-layer perceptron according to steps 305 and 306, and multiple second feature vectors are used to constitute an aggregated feature 503.

In the embodiments of this application, the description is made by taking a case where each scale corresponds to multiple local features as an example. However, in another embodiment, any scale corresponds to one local feature, sub-features in the local feature corresponding to the scale are spliced to obtain a first feature vector corresponding to the local feature, and the first feature vector is determined as an aggregated feature.

In the embodiments of this application, the description is made by taking a case where the local feature includes second sub-feature at multiple positions as an example, and multiple aggregated features are acquired based on each scale in the multiple scales and the image feature of the pathological image. However, in another embodiment, it is unnecessary to perform steps 304 to 306, and another method can be adopted to extract multiple local features corresponding to each scale from the image feature for each scale in the multiple scales, and aggregate the multiple local features corresponding to the scale to obtain an aggregated feature.

307: The computer device splices the multiple obtained aggregated features to obtain a spliced image feature.

In the embodiments of this application, the image feature of the pathological image is processed based on the multiple scales to obtain the multiple aggregated features. Different aggregated features contain feature information corresponding to different scales, and the multiple aggregated features are spliced, so that the spliced image feature contains the feature information corresponding to the multiple scales.

In a possible implementation, step 307 includes the following sub-step: features at the same position in the multiple aggregated features are spliced to obtain feature vector corresponding to multiple positions; and the feature vectors corresponding to the multiple positions are used to constitute a three-dimensional feature matrix, and the three-dimensional feature matrix is determined as the spliced image feature.

In the embodiments of this application, feature sizes of the multiple aggregated features are the same, each aggregated feature includes features at multiple positions, and the feature at each position is one second feature vector. For different aggregated features, the features at the same position are a feature of a pixel at the same position in the pathological image. Therefore, the features at the same position in the multiple aggregated features are spliced to obtain the feature vectors corresponding to the multiple positions. Based on the multiple positions, the feature vectors corresponding to the multiple positions are used to constitute one three-dimensional feature matrix, and the three-dimensional feature matrix is determined as the spliced image feature.

For example, there are 3 scales, a feature size of each aggregated feature is 4×4×10, and a feature size of a spliced image feature obtained by splicing the 3 aggregated features is 4×4×30.

In a possible implementation, the spliced image feature obtained based on the multiple aggregated features satisfies the following relationship:

$$E''=\text{Concat}(E_1', E_2', \ldots, E_\gamma')$$

$$E'' \in R^{H'' \times W'' \times C}$$

$$C=\gamma d_z$$

where, $E''$ represents the spliced image feature; $\text{Concat}(\cdot)$ represents a splicing function; $E_1'$, $E_2'$, and $E_\gamma'$ represent aggregated features obtained based on different scales, and $\gamma$ represents a quantity of multiple scales; $E'' \in R^{H'' \times W'' \times C}$ represents that a feature size of the spliced image feature is $H'' \times W'' \times C$; a feature size of the image feature of the pathological image is $W' \times H' \times D$, $W'$ and $H'$ represents a length and a width of the image feature of the pathological image, D represents a dimension of each second sub-feature in the image feature of the pathological image, and $W'$, $H'$, and D are all positive integers; $H''$ represents that a quantity for dividing the dimension $H'$ of the image feature of the pathological image when the local features are extracted from the image feature of the pathological image according to each scale; $W''$ represents that a quantity for dividing the dimension $W'$ of the image feature of the pathological image when the local features are extracted from the image feature of the pathological image according to each scale; C represents a feature size of each first sub-feature in the spliced image feature; and $d_z$ represents a vector dimension of each second feature vector.

308: The computer device updates each first sub-feature based on multiple first sub-features in the spliced image feature to obtain a first updated feature corresponding to each first sub-feature.

The spliced image feature includes first sub-features at multiple positions, that is, the spliced image feature includes multiple first sub-features, and each first sub-feature contains feature information corresponding to different scales. In the embodiments of this application, there is a correlation in the first sub-features at different positions. Each first sub-feature is updated by the self-attention mechanism through the multiple first sub-features, so that the first updated feature obtained by updating is fused with other first sub-features, and the accuracy of the first updated feature is ensured.

In a possible implementation, step 308 includes the following sub-steps: for a sub-feature in the multiple first sub-features, weights of the multiple first sub-features are acquired; and the multiple first sub-features are weighted and fused based on the weights of the multiple first sub-features to obtain the first updated feature corresponding to the sub-feature.

The weight of any first sub-feature is used for indicating a degree of correlation between the first sub-feature and the sub-feature. The larger the weight is, the higher the degree of correlation between the first sub-feature and the sub-feature is; and the smaller the weight is, the lower the degree of correlation between the first sub-feature and the sub-feature is. The weight of each first sub-feature represents a degree of correlation between the first sub-feature and the sub-feature, and the multiple first sub-features are weighted and fused into the first updated feature according to degrees of correlations between the multiple first sub-features and the sub-feature, so that the accuracy of the obtained first updated feature is ensured. According to the foregoing method of acquiring the first updated feature corresponding to the sub-feature, the first updated feature corresponding to each first sub-feature can be acquired.

In a possible implementation, the process of acquiring the weight of each first sub-feature includes the following steps: for the sub-feature in the multiple first sub-features, a distance feature of each first sub-feature and the sub-feature is acquired; and the weight of each first sub-feature is acquired based on the similarity between each first sub-feature and the sub-feature and the distance feature.

The distance feature of any first sub-feature and the sub-feature is used for indicating a distance between positions of the first sub-feature and the sub-feature in the spliced image feature; and the similarity between any first sub-feature and the sub-feature represents a level of similarity between the first sub-feature and the sub-feature.

In the embodiments of this application, there may be a correlation in features at different positions in the pathological image. For any first sub-feature, the similarity between the first sub-feature and the sub-feature can represent a level of similarity between the first sub-feature and the sub-feature, the distance feature of the first sub-feature and the sub-feature can indicate the distribution of the first sub-feature and the sub-feature in the spliced image feature, and the weight of the first sub-feature is acquired based on the similarity between the first sub-feature and the sub-feature and the distance feature, which not only takes account of a level of similarity between the first sub-feature and the sub-feature, but also takes account of a relative position relationship between the first sub-feature and the to-be-processed feature, that is, takes full account of the correlation between the first sub-feature and the sub-feature. Therefore, the accuracy of the acquired weight is ensured.

In a possible implementation, the process of acquiring the distance feature includes the following steps: a distance corresponding to each first sub-feature is determined based on positions of each first sub-feature and the sub-feature in the spliced image feature; and the distance corresponding to each first sub-feature is mapped to obtain the distance feature of each first sub-feature and the sub-feature.

The distance corresponding to any first sub-feature represents a distance between the positions of the first sub-feature and the sub-feature. The position of each first sub-feature in the spliced image feature can be represented in any form. For example, the position of each first sub-feature in the spliced image feature is represented in the form of two-dimensional coordinates. For any first sub-feature, a distance, that is, a target distance corresponding to the first sub-feature, between the positions of the first sub-feature and the sub-feature may be determined based on a position corresponding to the first sub-feature and a position corresponding to the sub-feature. The distance corresponding to the first sub-feature is mapped to the distance feature, so that the weight of the first sub-feature can be acquired based on the distance feature subsequently.

In a possible implementation, the process of acquiring the weight of each first sub-feature based on the similarity between each first sub-feature and the sub-feature and the distance feature includes the following steps: for each first sub-feature in the multiple first sub-features, the similarity between the first sub-feature and the sub-feature and the distance feature are fused to obtain a first matching degree corresponding to the first sub-feature; the sum of the first matching degrees corresponding to the multiple first sub-features is determined; and a ratio of the first matching degree corresponding to each first sub-feature to the sum is determined as the weight of each first sub-feature.

The first matching degree corresponding to any first sub-feature indicates a degree of matching of the first sub-feature with the sub-feature. When the weight of any sub-feature is acquired, the first matching degree of each first sub-feature and the sub-feature is acquired first. In view of the matching degrees of the multiple first sub-feature and the sub-feature, the ratio of the first matching degree corresponding to each first sub-feature to the sum is determined as the weight of each first sub-feature, which ensures that the first sub-feature that is matched more with the sub-feature has a larger weight. Therefore, the accuracy of the weight is ensured.

In a possible implementation, the process of acquiring the first matching degree of any first sub-feature and the sub-feature includes the following steps: the similarity between the first sub-feature and the sub-feature and the distance feature are fused to obtain a second matching degree; and feature transformation is performed on the second matching degree to obtain the first matching degree corresponding to the first sub-feature.

First the second matching degree is acquired, and feature transformation is performed on the second matching degree, so that the first matching degrees corresponding to the first sub-features belong to the same interval, which facilitates the subsequent comparison of the first matching degrees corresponding to the multiple first sub-features.

In a possible implementation, for the sub-feature in the multiple first sub-features, the weight of any first sub-feature satisfies the following relationship:

$$a_{ij}(X, W^Q, W^k) = \frac{\exp(\eta''_{ij})}{\sum_{k=1}^{N} \exp(\eta''_{ik})}$$

$$\eta''_{ij} = \frac{(e''_i W^Q)(e''_j W^K)^T}{\sqrt{d''_z}} + \lambda_{\mu(\rho_i, \rho_j)}$$

-continued $$\lambda_{\mu(\rho_i, \rho_j)} = \theta(\mu(\rho_i, \rho_j))$$

$$\rho_i = (r''_i, c''_i); \rho_j = (r''_j, c''_j)$$

$$\mu(\rho_i, \rho_j) = \sqrt{(r''_i, r''_j)^2 + (c''_i, c''_j)^2}$$

where, in the multiple first sub-features, a sub-feature $e''_i$ is an $i^{th}$ first sub-feature in the multiple first sub-features; any first sub-feature is a $j^{th}$ first sub-feature $e''_j$ in the multiple first sub-features; $a_{ij}(X, W^Q, W^K)$ represents a weight of the first sub-feature $e''_j$; X represents a feature matrix composed of the multiple first sub-features, and $W^Q$ and $W^K$ are constant matrices; $\exp(\eta''_{ij})$ represents a first matching degree corresponding to the first sub-feature $e''_j$; $\exp(\cdot)$ represents an exponential function with a natural constant e as a base; $\eta''_{ij}$ represents a second matching degree of the first sub-feature $e''_j$ and the sub-feature $e''_i$; $\sum_{j=1}^{N} \exp(\eta''_{ik})$ represents the sum of the first matching degrees corresponding to the multiple first sub-features; N represents a total quantity of multiple first sub-features; $\eta''_{ik}$ represents a second matching degree of a $k^{th}$ first sub-feature in the multiple first sub-features and the sub-feature $$e''_i; \frac{(e''_i W^Q)(e''_j W^K)^T}{\sqrt{d''_z}}$$

represents the similarity between the first sub-feature $e''_j$ and the sub-feature $e''_i$; $d''_z$ is any constant; T represents transposition for the matrix; $\lambda_{\mu(\rho_i, \rho_j)}$ represents a distance feature of the first sub-feature $e''_j$ and the sub-feature $e''_i$; $\theta(\cdot)$ represents a mapping function used for mapping a distance to a distance feature; $\mu(\rho_i, \rho_j)$ represents a distance corresponding to the first sub-feature $e''_j$; $\rho_i$ represents a position of the sub-feature $e''_i$ in the spliced image feature, and $(r''_i, c''_i)$ represents two-dimensional coordinates of the position of the sub-feature $e''_i$ in the spliced image feature; $\rho_j$ represents a position of the first sub-feature $e''_j$ in the spliced image feature; and $(r''_j, c''_j)$ represents two-dimensional coordinates of the position of the first sub-feature $e''_j$ in the spliced image feature.

Figure 6:
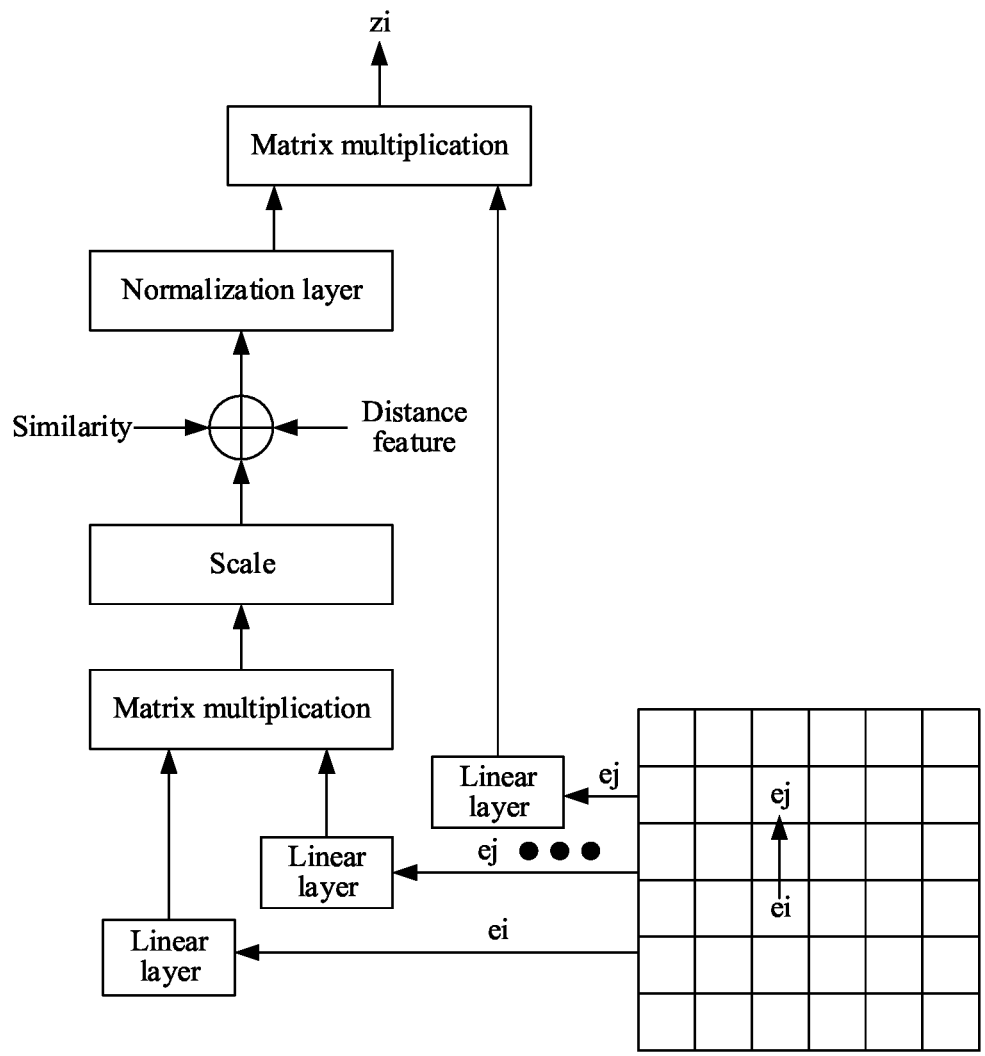
FIG. 6 is a flowchart of acquisition of a first updated feature corresponding to a sub-feature according to an embodiment of this application.

In a possible implementation, the first updated feature corresponding to the sub-feature satisfies the following relationship:

$$z_i = A(E'', W^Q, W^K, W^V) = \sum_{j=1}^{N} a_{ij}(X, W^Q, W^K)(e''_j W^V)$$

$$z_i \in R^{d_z}; W^Q, W^K, W^V \in R^{C \times d_z}$$

where, $z_i$ represents the first updated feature corresponding to the sub-feature; E" represents the spliced image feature; $W^Q$, $W^K$, and $W^V$ are all constant matrices; N represents a total quantity of multiple first sub-features; $e''_j$ represents a $j^{th}$ first sub-feature in the multiple first sub-features; $a_{ij}(X, W^Q, W^K)$ represents a weight of the first sub-feature $e''_j$; $\sum_{j=1}^{N} a_{ij}(X, W^Q, W^K)(e''_j W^V)$ represents that the multiple first sub-features are weighted and fused based on the weights of the multiple first sub-features; $z_i \in R^{d_z}$ represents that the first updated feature $z_i$ corresponding to the sub-feature is a feature vector with a dimension of $d_z$, and $d_z$ is any positive integer; and $W^Q$, $W^K$, $W^V \in R^{c \times d_z}$ represents that sizes of the constant matrices $W^Q$, $W^K$, and $W^V$ are $C \times d_z$, and C and $d_z$ are both any positive integer. The process of acquiring the first updated feature corresponding to the sub-feature based on the multiple first sub-features in the spliced image feature is shown in FIG. 6.

309: The computer device uses the first updated features corresponding to the multiple first sub-features to constitute a three-dimensional feature matrix based on positions of the multiple first sub-features in the spliced image feature, and determines the three-dimensional feature matrix as an updated spliced image feature.

The first updated feature is a vector, that is, the first updated feature corresponding to each first sub-feature is a vector. The multiple first updated features are used to constitute one three-dimensional feature matrix according to the positions of the multiple first sub-features in the spliced image feature, and the three-dimensional feature matrix is the updated spliced image feature, so that the updated spliced image feature retains position information of different features, and the accuracy of the updated spliced image feature is ensured.

For example, a feature size of the spliced image feature before updating is 3×3×10, and each first sub-feature is a feature vector with a dimension of 10, that is, the spliced image feature before updating includes 9 positions; and the first updated feature corresponding to each first sub-feature is a feature vector with a dimension of 8, that is, a feature size of the updated spliced image feature composed of the multiple first updated features is 3×3×8.

In a possible implementation, the updated spliced image feature satisfies the following relationship:

$$Z = (z_1, z_2, \ldots, z_N)$$

where, Z represents the updated spliced image feature, $z_1$, $z_2$, and $Z_N$ respectively represent the first first updated feature, the second first updated feature, and the $N^{th}$ first updated feature in the updated spliced image feature, N represents a total quantity of multiple first updated features, and N is a positive integer greater than 1.

In a possible implementation, according to steps 308 and 309, the process of acquiring the updated spliced image feature based on the spliced image feature satisfies the following relationship:

$$SETL(E'') = MLP(MSA^{SET}(LN(E'')))$$

$$E'' = (e_1'', e_2'', \ldots, e_{H''W''}'')$$

where, SETL(E") represents the updated spliced image feature; E" represents the spliced image feature; LN(·) represents a linear transformation function; $MSA^{SET}(\cdot)$ represents a multi-head self-attention function used for acquiring the first updated feature corresponding to each first sub-feature according to step 308; MLP(·) represents a multi-layer perception function used for performing fully connected transformation on a feature; $e_1''$, $e_2''$, and $e_{H''W''}''$, represent the first sub-features in the spliced image feature; and H"W" represents a total quantity of multiple first sub-features in the spliced image feature.

In the embodiments of this application, the description is made by taking a case where the first updated feature is a vector as an example. However, in another embodiment, the first updated feature is not a vector, it is unnecessary to perform step 309, and another method can be adopted to use the first updated features corresponding to the multiple first sub-features to constitute the updated spliced image feature based on the positions of the multiple first sub-features in the spliced image feature. For example, the first updated feature includes one feature element, the first updated features corresponding to the multiple first sub-features are used to constitute one two-dimensional feature matrix based on the positions of the multiple first sub-features in the spliced image feature, and the two-dimensional feature matrix is determined as the updated spliced image feature.

310: The computer device classifies the updated spliced image feature to obtain a category to which the pathological image belongs.

Each first updated feature in the updated spliced image feature is fused with features in the local features of different scales, and is also fused with the first sub-features at the positions in the whole spliced image feature according to the degrees of correlations between the first sub-features at the positions in the whole spliced image feature, so that the updated spliced image feature is enriched, and the accuracy of the updated spliced image feature is ensured. The updated spliced feature is classified, so that the accuracy of the determined category is ensured.

In a possible implementation, the category to which the pathological image belongs indicates a state of a specific region in the pathological image.

In a possible implementation, step 310 includes the following sub-step: the updated spliced image feature is classified to obtain a classified feature vector, and a category corresponding to a maximum probability in the classified feature vector is determined as the category to which the pathological image belongs.

In the embodiments of this application, the classified feature vector includes probabilities of multiple dimensions, and the probability of each dimension is used for indicating the probability that the pathological image belongs to a category corresponding to the dimension. The updated spliced image feature is classified to obtain the classified feature vector indicating probabilities that the pathological image belongs to multiple categories, and the category corresponding to the maximum probability in the classified feature vector is determined as the category to which the pathological image belongs, so that the accuracy of the determined category is ensured.

In a possible implementation, the updated spliced image feature and the category to which the pathological image belongs satisfy the following relationship:

$$Y = \Phi(SETL(E''))$$

where, Y represents the category to which the pathological image belongs; SETL(E") represents the updated spliced image feature; E" represents the spliced image feature; and Φ(·) represents a classification function.

In the embodiments of this application, after being acquired, the spliced image feature is updated according to steps 308 and 309, and the updated image feature is directly classified to obtain the category to which the pathological image belongs. However, in another embodiment, after step 309, the updated spliced image can be updated multiple times according to steps 308 and 309, and an updated spliced image feature obtained during the last updating is classified to obtain the category to which the pathological image belongs. After being obtained, in view of the correlation between features at different positions, the spliced image feature is updated multiple times to fully fuse the features at different positions in the spliced image feature, so that a finally obtained updated spliced image feature retains position information of different features, and the accuracy of the updated spliced image feature is ensured.

In a possible implementation, after the spliced image feature is obtained, the process of updating the spliced image feature multiple times, and classifying the updated spliced image feature obtained during the last updating to obtain the category to which the pathological image belongs satisfies the following relationship:

$$Y = \Phi\left(SETL\left(\underset{M}{...}, SETL(E'')\right)\right)$$

where, Y represents the category to which the pathological image belongs; SETL(E") represents an obtained updated spliced image feature after the spliced image feature is updated once; E" represents the spliced image feature; M represents the number of updating performed on the spliced image feature, and M is any positive integer, for example, M is 6; and Φ(·) represents a classification function.

The method according to the embodiments of this application can be applied to classification tasks for multiple types of pathological images, such as cancer classification, lymph node metastasis, and gene mutation prediction. For example, for a pathological image corresponding to any cancer type, a state that corresponds to a cancerous region corresponding to the pathological image can be determined by the method according to the embodiments of this application.

According to the method provided in the embodiments of this application, after being acquired, an image feature of a pathological image is processed according to multiple scales to obtain aggregated features corresponding to the multiple scales, and the aggregated features corresponding to the multiple scales are spliced into one spliced image feature, and the spliced image feature is classified to obtain a category to which the pathological image belongs. The aggregated feature corresponding to different scales are obtained by aggregating local features of different scales, and the local features corresponding to different scales contain different information, so that the multiple aggregated features contain feature information corresponding to different scales. The multiple aggregated features are spliced into the spliced image feature, so that the spliced image feature contains the feature information corresponding to different scales, and the feature information of the spliced image feature is enriched. The category to which the pathological image belongs is determined based on the spliced image feature, so that the accuracy of the category is ensured.

In the embodiment shown in FIG. 3, after the spliced image feature is obtained, each first sub-feature is first updated based on the first sub-features at multiple positions in the spliced image feature to obtain the updated spliced image feature, and then the updated spliced image feature is classified. However, in another embodiment, it is unnecessary to perform steps 308 to 310, and after the spliced image feature is obtained, another method can be adopted to classify the spliced image feature to obtain the category to which the pathological image belongs.

In a possible implementation, after the spliced image feature is acquired, the process of acquiring the category to which the pathological image belongs based on the spliced image feature includes the following step 1 to step 3.

Step 1: The computer device fuses each first sub-feature in the spliced image feature with a corresponding position feature to obtain a second updated feature corresponding to each first sub-feature.

In the embodiments of this application, the spliced image feature includes the first sub-features at multiple positions; and the position feature corresponding to any first sub-feature is used for indicating the position of the first sub-feature in the spliced image feature and can be represented in any form. For example, the position feature is represented in the form of a vector or coordinates.

Each second updated feature is obtained by fusing the corresponding first sub-feature with the corresponding position feature, so that spatial information of the first sub-features in the spliced image feature is increased, a difference between different first sub-features is increased, and the accuracy of the obtained second updated feature is improved.

Step 2: The computer device uses the second updated features corresponding to the multiple first sub-features to constitute an updated spliced image feature based on the positions of the multiple first sub-features in the spliced image feature.

After each first sub-feature is updated, each second updated feature is fused with the position feature of the corresponding first sub-feature, so that the difference between different first sub-features is increased. The multiple second updated features are used to constitute the updated spliced image feature according to the positions of the multiple first sub-features in the spliced image feature and a position arrangement of the multiple first sub-features, so that the updated spliced image feature include the second updated features at multiple positions. The second updated features in the updated spliced image feature are fused with respective position features, so that the difference between different first sub-features is increased, and the accuracy of the updated spliced image feature is improved.

In a possible implementation, the second updated feature is a vector. Step 2 includes the following sub-steps: the second updated features corresponding to the multiple first sub-features are used to constitute a three-dimensional feature matrix based on the positions of the multiple first sub-features in the spliced image feature, and the three-dimensional feature matrix is determined as the updated spliced image feature.

In the embodiments of this application, the first sub-feature is a vector, and the second updated feature obtained by fusing each first sub-feature with the corresponding position feature is also a vector. Dimensions of any first sub-feature and the corresponding second updated feature may be the same or different. For example, a feature size of the spliced image feature is 3×3×10, that is, the spliced image feature includes 9 first sub-features, and each first sub-feature is a feature vector with a dimension of 10. When the dimensions of each first sub-feature and the corresponding second updated feature are the same, a feature size of an updated spliced image feature obtained by splicing 9 second updated features is 3×3×10; and when the dimensions of each first sub-feature and the corresponding second updated feature are different, the dimension of each second updated feature is 20, and a feature size of an updated spliced image feature obtained by splicing 9 second updated features is 3×3×20.

Step 3: The computer device classifies the updated spliced image feature to obtain a category to which the pathological image belongs.

Step 3 is the same as step 310, which is not described in detail here.

According to the method provided in the embodiments of this application, after a spliced image feature is obtained, each first sub-feature in the spliced image feature is fused with a corresponding position feature to obtain a second updated feature corresponding to each first sub-feature, so that a difference between different first sub-features is increased. The second updated features in the obtained updated spliced image feature are fused with respective position features, so that the difference between different first sub-features is increased, and the accuracy of the updated spliced image feature is improved. The updated spliced image feature is classified, so that the accuracy of a determined category is ensured.

The foregoing multiple method of updating the spliced image feature to acquire the updated spliced image feature can be combined arbitrarily. In a possible implementation, after the spliced image feature is acquired, the process of acquiring the category to which the pathological image belongs based on the spliced image feature includes the following step 4 to step 8.

Step 4: The computer device fuses each first sub-feature in the spliced image feature with a corresponding position feature to obtain a second updated feature corresponding to each first sub-feature.

Step 4 is the same as step 1, which is not described in detail here.

Step 5: The computer device uses the second updated features corresponding to the multiple first sub-features to constitute a first spliced image feature based on the positions of the multiple first sub-features in the spliced image feature.

The first spliced image feature is equivalent to the updated spliced image feature obtained in step 2, and step 5 is the same as step 2, which is not described in detail here.

Step 6: The computer device updates each second updated feature based on the multiple second updated features to obtain a third updated feature corresponding to each second updated feature.

Step 6 is the same as step 308, which is not described in detail here.

Step 7: The computer device uses the multiple third updated features to constitute a second spliced image feature based on positions of the multiple second updated features in the first spliced image feature.

In the embodiments of this application, each third updated feature may include one feature element or may be a vector. When each third updated feature includes one feature element, the multiple third updated features are used to constitute one two-dimensional feature matrix based on the positions of the multiple second updated features in the first spliced image feature, and the two-dimensional feature matrix is determined as the second spliced image feature; and when each third updated feature is a vector, step 7 is the same as step 309, which is not described in detail here.

Step 8: The computer device classifies the second spliced image feature to obtain a category to which the pathological image belongs.

Step 8 is the same as step 310, which is not described in detail here.

According to the method provided in the embodiments of this application, in the process of updating the spliced image feature, a feature at each position in the spliced image feature is fused with corresponding position information, and is also fused with degrees of correlations between first sub-features at positions. The feature at each position is fused with the features at the positions, which takes account of absolute position information of the features at the positions in the spliced image feature, and also takes account of a relative position relationship between different positions. Local information and global information in the pathological image can be both captured, so that the accuracy of the second spliced image feature is improved. The updated spliced feature is classified, so that the accuracy of a determined category is ensured.

Based on the embodiments shown in FIG. 2 and FIG. 3, the pathological image can further be classified by using a classification model to obtain the category to which the pathological image belongs.

Figure 7:
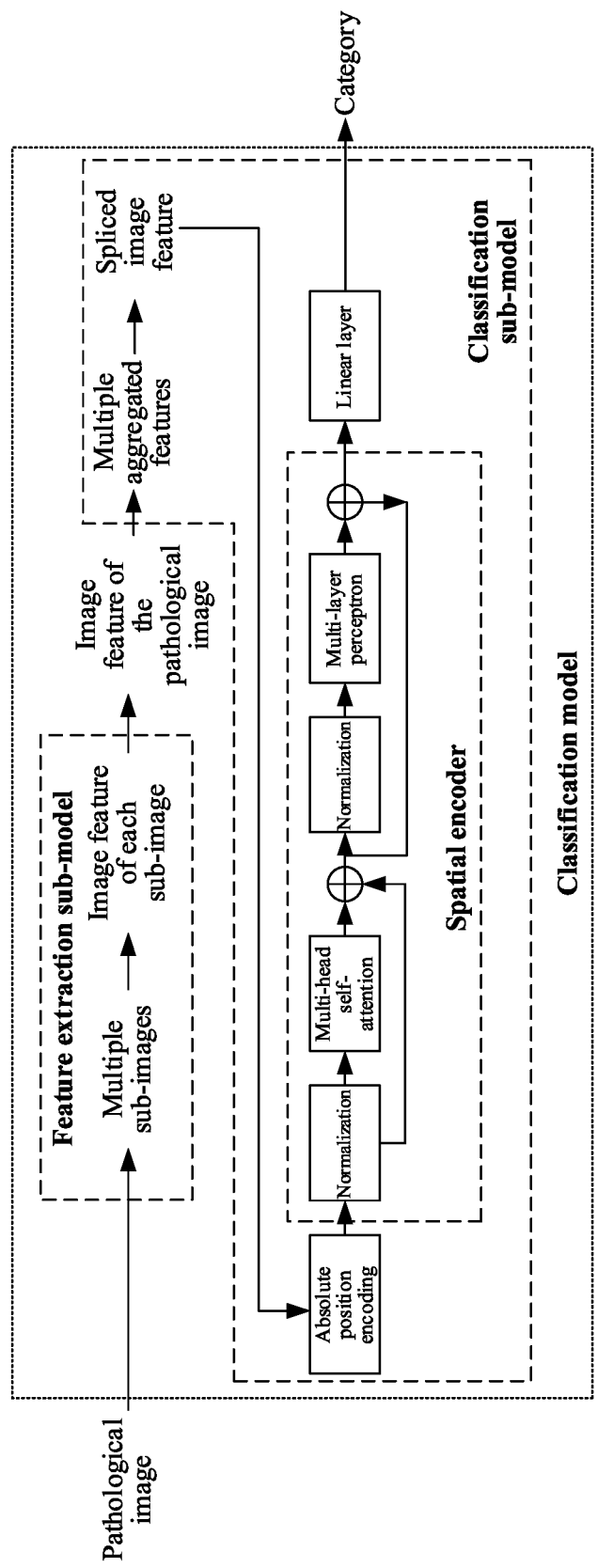
FIG. 7 is a flowchart of image classification based on a classification model according to an embodiment of this application.

In a possible implementation, the classification model includes a feature extraction sub-model and a classification sub-model, and the classification sub-model includes an absolute position encoding layer, at least one spatial encoder, and a linear layer. The process of classifying the pathological image based on the classification model is shown in FIG. 7. Based on the feature extraction sub-model, according to steps 301 to 303, a pathological image is segmented into multiple sub-images, an image feature of each sub-image is extracted, and the image features of the multiple sub-images are spliced into an image feature of the pathological image.

Based on the classification sub-model, according to steps 304 to 306, multiple aggregated features are acquired according to multiple scales; and according to step 307, the multiple aggregated features are spliced to obtain a spliced image feature.

Based on the absolute position encoding layer, each first sub-feature in the spliced image feature is fused with a corresponding position feature to obtain a second updated feature corresponding to each first sub-feature, and the second updated features corresponding to the multiple first sub-features in the spliced image feature are used to constitute a first spliced image feature based on positions of the multiple first sub-features in the spliced image feature.

Based on the first spatial encoder, according to steps 308 and 309, each second updated feature is updated based on the multiple second updated features in the first spliced image feature to obtain a third updated feature corresponding to each second updated feature; and the multiple third updated features are used to constitute a second spliced image feature based on positions of the multiple second updated features in the first spliced image feature.

Based on a $q^{th}$ spatial encoder, according to steps 308 and 309, a spliced image feature outputted by a $(q-1)^{th}$ spatial encoder is updated until the last spatial encoder outputs an updated spliced image feature, and q is an integer greater than 1.

Based on the linear layer in the classification sub-model, the updated spliced image feature outputted by the last spatial encoder is classified to obtain a category to which the pathological image belongs.

In a possible implementation, each spatial encoder includes a normalization layer, a multi-head attention layer, a fusion layer, and a multi-layer perceptron.

The first spatial encoder is taken as an example, based on the normalization layer, feature transformation is performed on the first spliced image feature to obtain a transformed first spliced image feature; based on the multi-head attention layer, according to steps 308 and 309, the transformed first spliced image feature is processed to obtain an updated first spliced image feature; based on the first fusion layer, the first spliced image feature and the updated first spliced image feature are fused to obtain a fused image feature, so that the accuracy of the fused image feature is improved; based on the second normalization layer, feature transformation is performed on the fused image feature to obtain transformed fused image feature; and based on the multi-layer perceptron, the transformed fused image feature is mapped to obtain a mapped feature, and the mapped feature and the transformed fused image feature are fused to obtain the second spliced image feature.

Before the pathological image is classified by using the foregoing classification model, the classification model needs to be trained. A case where the classification model includes the feature extraction sub-model and the classification sub-model is taken as an example, the process of training the classification model includes the following steps 1 to 4.

Step 1: Acquire a sample pathological image and a sample label, the sample label being used for indicating a category to which the sample pathological image belongs.

The sample pathological image is a pathological image used for presenting the pathological morphology of a body organ, tissue or cell, and a category indicated by the sample label is the category to which the sample pathological image belongs.

Step 2: Based on the feature extraction sub-model, acquire a sample image feature of the sample pathological image.

Step 2 is the same as steps 301 to 303, which is not described in detail here.

Step 3: Extract, for each scale in multiple scales, a sample local feature corresponding to the scale from the sample image feature based on the classification sub-model; splice the sample local features respectively corresponding to the scales to obtain a sample spliced image feature; and classify the sample spliced image feature to obtain a predicted label of the sample pathological image, the predicted label being used for indicating a predicted category to which the sample pathological image belongs.

Step 3 is the same as steps 304 to 310, which is not described in detail here.

Step 4: Train the classification model based on the predicted label and the sample label.

The predicted label is used for indicating the category which is predicted based on the classification model and to which the sample pathological image belongs, the sample label is used for indicating the category to which the sample pathological image belongs, and the accuracy rate of the classification model can be reflected by comparing the predicted label with the sample label. The classification model is trained based on the predicted label and the sample label, so that the accuracy of the classification model is improved.

In a possible implementation, step 4 includes the following sub-step: a loss value is determined based on the predicted label and the sample label, and the classification model is trained based on the loss value.

The loss value is used for representing a difference between the predicted label and the sample label. The classification model is trained based on the loss value, so that the accuracy of the classification model is improved.

In a possible implementation model, based on multiple sample pathological images and corresponding sample labels, according to steps 1 to 4, multiple rounds of iterative training are performed on the classification model, and when a loss value obtained during current iterative training is less than a loss value threshold, the training of the classification model ends; or, when the number of iterative training reaches the target number, the training of the classification model ends.

The loss value threshold or target number for training the classification model is set to make a trained classification model as accurate as possible, which ensures the accuracy of the classification model obtained by training.

In the foregoing process of training the classification model, the feature extraction sub-model may be any pre-trained image feature extraction model. For example, the feature extraction sub-model is a residual neural network (ResNet), a densely connected convolutional network (DenseNet), or an inception network. On basis of the feature extraction sub-model, the feature extraction sub-model and the classification sub-model are used to constitute the classification model, and the classification model is trained according to steps 1 to 4, so that the training time is saved, and the accuracy of the classification model is also ensured.

The classification model according to the embodiments of this application is compared with various classification models in the related technologies. The classification models in the related technologies include recurrent neural network-multiple instance learning (RNN-MIL), convolution neural network-multiple instance learning (CNN-MIL), and vision transformer-multiple instance learning (ViT-MIL). As shown in Table 1, in various different datasets, based on various different classification tasks, the classification model according to the embodiments of this application is compared with various classification models in the related technologies. Area under curve (AUC) of the classification model according to the embodiments of this application can be more than 90% for the first two datasets, and more than 90% for a lung adenocarcinoma-gene mutation dataset. It can be seen from Table 1 that the performance of the classification model provided in this application is superior to that of the classification models in the related technologies.

TABLE 1

| Model | AUC (%) | Accuracy rate (%) | Precision rate (%) | Recall rate | F1-score |
|---|---|---|---|---|---|
| Tumor dataset - non-small-cell lung cancer | | | | | |
| Recurrent neural network | 76.69 | 69.38 | 71.28 | 64.42 | 67.68 |
| Convolution neural network | 78.64 | 69.86 | 72.53 | 63.46 | 67.69 |
| Vision transformer | 86.37 | 78.47 | 83.15 | 71.15 | 76.68 |
| Classification model of this application | 91.18 | 85.17 | 82.30 | 89.42 | 85.71 |
| Tumor dataset - kidney cancer | | | | | |
| Recurrent neural network | 68.69 | 57.45 | 70.68 | 57.45 | 53.26 |
| Convolution neural network | 69.56 | 61.17 | 65.83 | 61.17 | 55.40 |
| Vision transformer | 90.21 | 76.60 | 80.25 | 76.60 | 77.29 |
| Classification model of this application | 95.83 | 87.23 | 87.50 | 87.23 | 87.30 |
| Lung adenocarcinoma-gene mutation | | | | | |
| Recurrent neural network | 50.31 | 56.68 | 53.49 | 27.38 | 36.22 |
| Convolution neural network | 45.28 | 44.92 | 44.92 | 99.99 | 61.99 |
| Vision transformer | 76.39 | 70.14 | 81.40 | 50.00 | 61.95 |
| Classification model of this application | 83.84 | 73.61 | 84.78 | 55.71 | 67.24 |
| Endometrial cancer-lymph node metastasis | | | | | |
| Recurrent neural network | 86.89 | 81.18 | 74.18 | 99.26 | 84.91 |
| Convolution neural network | 88.06 | 81.96 | 75.57 | 97.79 | 85.26 |
| Vision transformer | 91.15 | 86.27 | 80.24 | 98.53 | 88.45 |
| Classification model of this application | 96.34 | 92.94 | 92.75 | 94.12 | 93.43 |

The classification model according to the embodiments of this application includes a position encoding layer, encoder-based pyramid multi-scale fusion, and a spatial encoder. For example, the encoder-based pyramid multi-scale fusion is transformer-based pyramid multi-scale fusion (TPMF); and the spatial encoder is a spatial encoding transformer (SET). In order to determine degrees of importance of the parts in the classification model when an image is classified by using the classification model of this application, the classification model is tested on 4 different datasets, as shown in Table 2. It can be seen from data in Table 2 that all the parts in the classification model of this application are important, so that the classification model composed of the parts has higher classification performance.

TABLE 2

| Method | AUC (%) | Accuracy rate (%) | Precision rate (%) | Recall rate | F1-score |
|---|---|---|---|---|---|
| Tumor dataset - non-small-cell lung cancer | | | | | |
| w/o encoder-based multi-scale fusion & spatial encoder | 86.37 (−4.81) | 78.47 | 83.15 | 71.15 | 76.68 |
| w/o multi-scale fusion & spatial encoder | 85.82 (−5.36) | 77.03 | 77.45 | 75.96 | 76.70 |
| w/o spatial encoder | 88.07 (−3.11) | 77.99 | 87.18 | 65.38 | 74.73 |
| w/o multi-scale fusion | 90.33 (−0.85) | 82.30 | 80.18 | 85.58 | 82.79 |
| Classification model of this application | 91.18 | 85.17 | 82.30 | 89.42 | 85.71 |
| Tumor dataset - kidney cancer | | | | | |
| w/o encoder-based multi-scale fusion & spatial encoder | 90.21 (−5.62) | 76.60 | 80.25 | 76.60 | 77.29 |
| w/o multi-scale fusion & spatial encoder | 92.77 (−3.06) | 75.53 | 83.78 | 75.53 | 77.42 |
| w/o spatial encoder | 94.11 (−1.72) | 83.51 | 84.55 | 83.51 | 83.73 |
| w/o multi-scale fusion | 95.63 (−0.20) | 83.51 | 83.75 | 83.51 | 83.30 |
| Classification model of this application | 95.83 | 87.23 | 87.50 | 87.23 | 87.30 |
| Lung adenocarcinoma-gene mutation | | | | | |
| w/o encoder-based multi-scale fusion & spatial encoder | 76.39 (−7.45) | 70.14 | 81.40 | 50.00 | 61.95 |
| w/o multi-scale fusion & spatial encoder | 79.40 (−4.44) | 70.83 | 65.56 | 84.29 | 73.75 |
| w/o spatial encoder | 81.27 (−2.57) | 72.92 | 78.18 | 61.43 | 68.80 |
| w/o multi-scale fusion | 80.41 (−3.43) | 61.11 | 56.36 | 88.57 | 68.89 |
| Classification model of this application | 83.84 | 73.61 | 84.78 | 55.71 | 67.24 |
| Endometrial cancer-lymph node metastasis | | | | | |
| w/o encoder-based multi-scale fusion & spatial encoder | 91.15 (−5.19) | 86.27 | 80.24 | 98.53 | 88.45 |
| w/o multi-scale fusion & spatial encoder | 92.84 (−3.50) | 87.06 | 85.03 | 91.91 | 88.34 |
| w/o spatial encoder | 95.42 (−0.92) | 91.76 | 89.66 | 95.59 | 92.53 |
| w/o multi-scale fusion | 95.85 (−0.49) | 89.41 | 87.59 | 93.38 | 90.39 |
| Classification model of this application | 96.34 | 92.94 | 92.75 | 94.12 | 93.43 |

In the method according to the embodiments of this application, the performance of the classification model is evaluated according to various different position encoding policies. When the classification model is tested on 4 different datasets, two position encoding polices are set: absolute position encoding and relative position encoding. It can be seen from Table 3 that the accuracy of image classification can be improved when the absolute position encoding and relative position encoding mechanisms are used simultaneously.

TABLE 3

| Method | AUC (%) | Accuracy rate (%) | Precision rate (%) | Recall rate | F1-score |
|---|---|---|---|---|---|
| Tumor dataset - non-small-cell lung cancer | | | | | |
| w/o absolute position encoding | 89.91 (−1.27) | 84.69 | 86.00 | 82.69 | 84.31 |
| w/o relative position encoding | 88.07 (−3.11) | 77.99 | 87.18 | 65.38 | 74.73 |
| Classification model of this application | 91.18 | 85.17 | 82.30 | 89.42 | 85.71 |
| Tumor dataset - kidney cancer | | | | | |
| w/o absolute position encoding | 95.11 (−0.72) | 86.70 | 87.28 | 86.70 | 86.77 |
| w/o relative position encoding | 94.11 (−1.72) | 83.51 | 84.55 | 83.51 | 83.73 |
| Classification model of this application | 95.83 | 87.23 | 87.50 | 87.23 | 87.30 |
| Lung adenocarcinoma-gene mutation | | | | | |
| w/o absolute position encoding | 75.56 (−8.28) | 72.22 | 70.27 | 74.29 | 72.22 |
| w/o relative position encoding | 81.27 (−2.57) | 72.92 | 78.18 | 61.43 | 68.80 |
| Classification model of this application | 83.84 | 73.61 | 84.78 | 55.71 | 67.24 |
| Endometrial cancer-lymph node metastasis | | | | | |
| w/o absolute position encoding | 89.32 (−7.02) | 80.39 | 85.25 | 76.47 | 80.62 |
| w/o relative position encoding | 95.42 (−0.92) | 91.76 | 89.66 | 95.59 | 92.53 |
| Classification model of this application | 96.34 | 92.94 | 92.75 | 94.12 | 93.43 |

Figure 8:
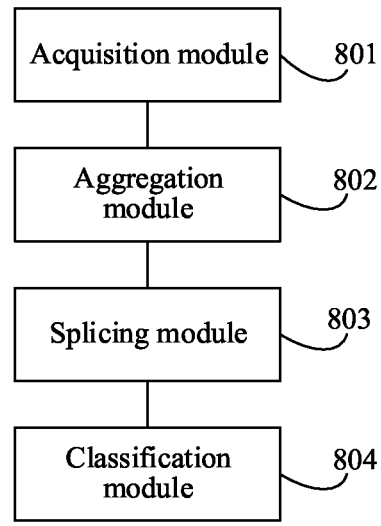
FIG. 8 is a schematic structural diagram of an image classification apparatus according to an embodiment of this application.

FIG. 8 is a schematic structural diagram of an image classification apparatus according to an embodiment of this application. As shown in FIG. 8, the apparatus may include:

an acquisition module 801, configured to acquire an image feature of a pathological image;

an aggregation module 802, configured to extract, for each scale in multiple scales, a local feature corresponding to the scale from the image feature;

a splicing module 803, configured to splice the local features respectively corresponding to the scales to obtain a spliced image feature; and a classification module 804, configured to classify the spliced image feature to obtain a category to which the pathological image belongs.

In a possible implementation, the aggregation module 802 is further configured to aggregate, when each scale corresponds to multiple local features, the multiple local features corresponding to the scale to obtain an aggregated feature.

The splicing module 803 is specifically configured to splice the multiple aggregated features to obtain the spliced image feature.

Figure 9:
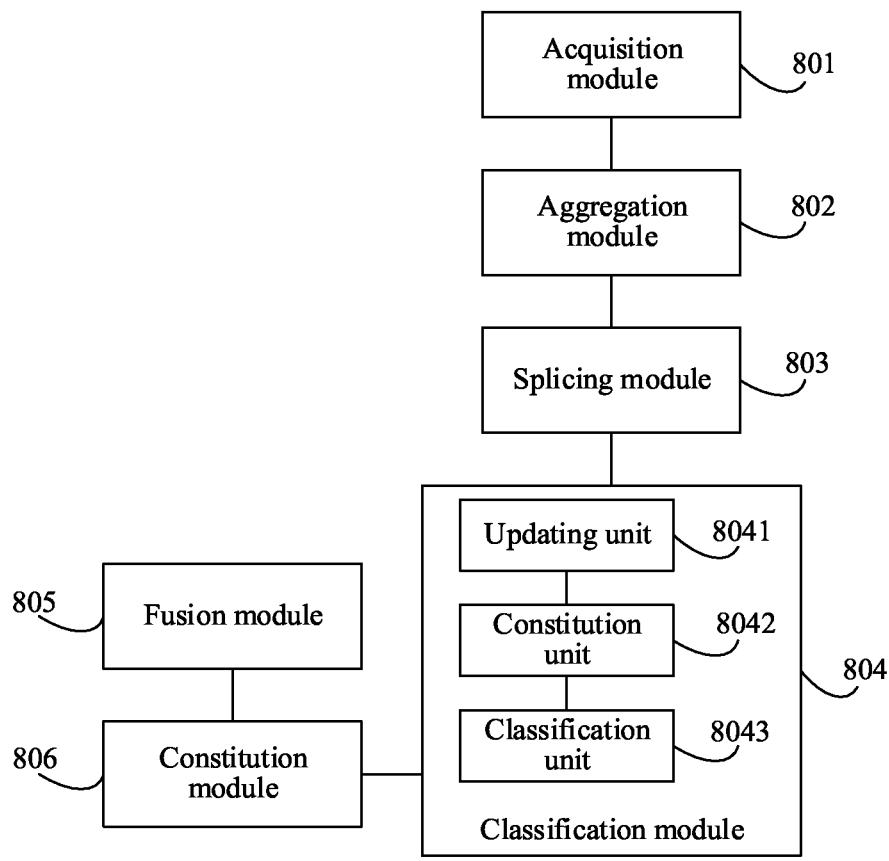
FIG. 9 is a schematic structural diagram of an image classification apparatus according to an embodiment of this application.

In a possible implementation, the spliced image feature includes first sub-features at multiple positions. As shown in FIG. 9, the classification module 804 includes:

an updating unit 8041, configured to update each first sub-feature based on the multiple first sub-features to obtain a first updated feature corresponding to each first sub-feature;

a constitution unit 8042, configured to use the first updated features corresponding to the multiple first sub-features to constitute an updated spliced image feature based on positions of the multiple first sub-features in the spliced image features; and
- a classification unit 8043, configured to classify the updated spliced image feature to obtain the category to which the pathological image belongs.

In another possible implementation, the updating unit 8041 is configured to acquire, for a sub-feature in the multiple first sub-features, weights of the multiple first sub-features, the weight being used for indicating a degree of correlation between a corresponding first sub-feature and the sub-feature; and weight and fuse the multiple first sub-features based on the weights of the multiple first sub-features to obtain a first updated feature corresponding to the sub-feature.

In another possible implementation, the updating unit 8041 is configured to acquire, for the sub-feature in the multiple first sub-features, a distance feature of each first sub-feature and the sub-feature, the distance feature being used for indicating a distance between positions of the first sub-feature and the sub-feature in the spliced image feature; and acquire the weight of each first sub-feature based on the similarity between each first sub-feature and the sub-feature and the distance feature.

In another possible implementation, the updating unit 8041 is configured to determine a distance corresponding to each first sub-feature based on the positions of each first sub-feature and the sub-feature in the spliced image feature, the distance corresponding to the first sub-feature being used for representing a distance between the positions of the first sub-feature and the sub-feature; and map the distance corresponding to each first sub-feature to obtain the distance feature of each first sub-feature and the sub-feature.

In another possible implementation, the first updated feature is a vector; and the constitution unit 8042 is configured to use the first updated features corresponding to the multiple first sub-features to constitute a three-dimensional feature matrix based on the positions of the multiple first sub-features in the spliced image feature, and determine the three-dimensional feature matrix as the updated spliced image feature.

In another possible implementation, the spliced image feature includes first sub-features at multiple positions; and as shown in FIG. 9, the apparatus further includes:
- a fusion module 805, configured to fuse each first sub-feature with a corresponding position feature to obtain a second updated feature corresponding to each first sub-feature, the position feature being used for indicating a position of the corresponding first sub-feature in the spliced image feature; and
- a constitution module 806, configured to use the multiple second updated features corresponding to the multiple first sub-features to constitute the updated spliced image feature based on the positions of the multiple first sub-features in the spliced image feature.

In another possible implementation, the second updated feature is a vector; and the constitution module 806 is configured to use the second updated features corresponding to the multiple first sub-features to constitute a three-dimensional feature matrix based on the positions of the multiple first sub-features in the spliced image feature, and determine the three-dimensional feature matrix as the updated spliced image feature.

In a possible implementation, the local feature includes second sub-features at multiple positions; and the aggregation module 802 is configured to splice the second sub-features in each extracted local feature to obtain a first feature vector corresponding to each local feature; update each first feature vector based on the first feature vectors corresponding to the multiple local features to obtain a second feature vector corresponding to each first feature vector; and use the multiple second feature vectors to constitute a three-dimensional feature matrix based on positions of the multiple local features in the image feature, and determine the three-dimensional feature matrix as the aggregated feature.

In a possible implementation, the acquisition module 801 is configured to segment the pathological image to obtain multiple sub-images; perform feature extraction on each sub-image to obtain an image feature of each sub-image; and splice the image features of the multiple sub-images based on positions of the multiple sub-images in the pathological image to obtain the image feature of the pathological image.

In another possible implementation, feature sizes of the multiple aggregated features are the same; and the splicing module 803 is configured to splice features at the same position in the multiple aggregated features to obtain feature vectors corresponding to multiple positions; and use the feature vectors corresponding to multiple positions to constitute a three-dimensional feature matrix, and determine the three-dimensional feature matrix as the spliced image feature.

In another possible implementation, the operations of acquiring an image feature of a pathological image; extracting, for each scale in multiple scales, a local feature corresponding to the scale from the image feature; splicing the local features respectively corresponding to the scales to obtain a spliced image feature; and classifying the spliced image feature to obtain a category to which the pathological image belongs are implemented based on a classification model.

In another possible implementation, the classification model includes a feature extraction sub-model and a classification sub-model; and as shown in FIG. 9, the apparatus further includes:
- the acquisition module 801, further configured to acquire a sample pathological image and a sample label, the sample label being used for indicating a category to which the sample pathological image belongs;
- the acquisition module 801, further configured to acquire a sample image feature of the sample pathological image based on the feature extraction sub-model;
- a prediction module 807, configured to extract, for each scale in multiple scales, a sample local feature corresponding to the scale from the sample image feature based on the classification sub-model; splice the sample local features respectively corresponding to the scales to obtain a sample spliced image feature; and classify the sample spliced image feature to obtain a predicted label of the sample pathological image, the predicted label being used for indicating a predicted category to which the sample pathological image belongs; and
- a training module 808, configured to train the classification model based on the predicted label and the sample label.

The image classification apparatus provided in the foregoing embodiments is illustrated with an example of division of the foregoing functional modules. In practical application, the foregoing functions may be allocated to and completed by different functional modules according to requirements, that is, an internal structure of a computer device is divided into different functional modules, so as to complete all or some of the foregoing functions. In addition, the image classification apparatus provided in the foregoing embodiments belongs to the same conception as the image classification method embodiments, and a specific implementation process may refer to the method embodiments, which is not described in detail here.

The embodiments of this application further provide a computer device, which includes a process and a memory. The memory stores at least one segment of computer program that, when loaded and executed by the processor, implements operations performed in the image classification method according to the foregoing embodiments.

Figure 10:
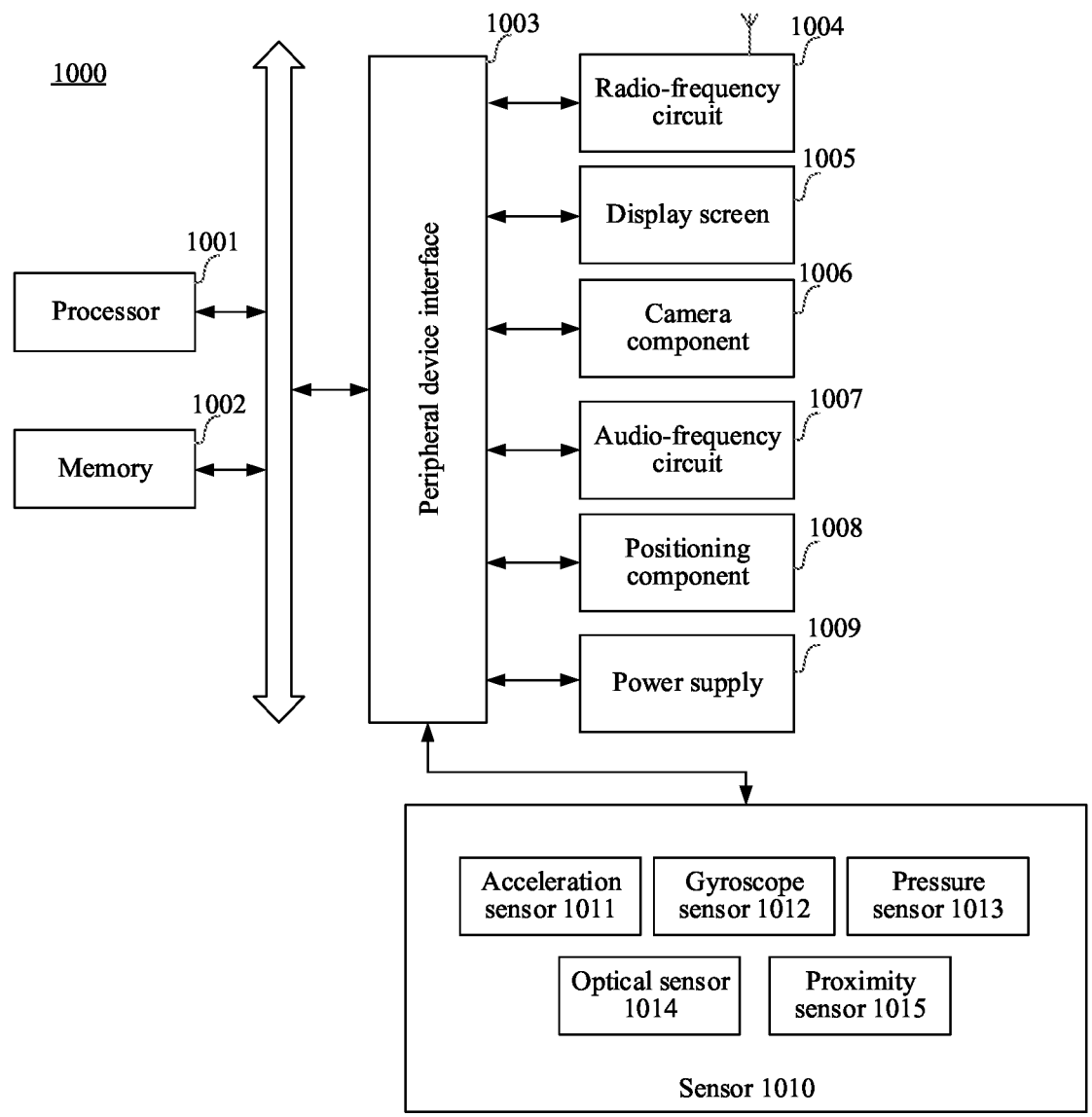
FIG. 10 is a schematic structural diagram of a terminal according to an embodiment of this application.

In a possible implementation, the computer device is provided as a terminal. FIG. 10 shows a structural block diagram of a terminal 1000 according to an exemplary embodiment of this application. The terminal may be a smartphone, a tablet computer, a notebook computer, a desktop computer, a smart speaker, a smartwatch, a smart voice interaction device, a smart household appliance, an on-board terminal, or the like.

The terminal 1000 includes: a processor 1001 and a memory 1002.

The processor 1001 may include one or more processing cores, such as a 4-core processor or an 8-core processor. The processor 1001 may be implemented by at least one hardware of a digital signal processor (DSP), a field-programmable gate array (FPGA), and a programmable logic array (PLA). The processor 1001 may also include a main processor and a coprocessor. The main processor is a processor configured to process data in an awake state, and is also referred to as a central processing unit (CPU); and the coprocessor is a low power processor configured to process data in a standby state. In some embodiments, the processor 1001 may be integrated with a graphics processing unit (GPU). The GPU is configured to render and draw content that needs to be displayed on a display screen. In some embodiments, the processor 1001 may further include an artificial intelligence (AI) processor. The AI processor is configured to process computing operations related to machine learning.

The memory 1002 may include one or more computer-readable storage media. The computer-readable storage medium may be non-transient. The memory 1002 may further include a high-speed random access memory and a non-volatile memory, such as one or more disk storage devices or flash storage devices. In some embodiments, the non-transient computer-readable storage medium in the memory 1002 is configured to store at least one computer program that, when executed by the processor 1001, implements the image classification method according to the method embodiments of this application.

In some embodiments, the terminal 1000 may further include: a peripheral device interface 1003 and at least one peripheral device. The processor 1001, the memory 1002, and the peripheral device interface 1003 may be connected via a bus or a signal cable. Each peripheral device may be connected to the peripheral device interface 1003 via a bus, a signal cable, or a circuit board. Specifically, the peripheral device includes: at least one of a radio-frequency circuit 1004, a display screen 1005, a camera component 1006, an audio-frequency circuit 1007, a positioning component 1008, and a power supply 1009.

In some embodiments, the terminal 1000 further includes one or more sensors 1010. The one or more sensors 1010 include, but are not limited to: an acceleration sensor 1011, a gyroscope sensor 1012, a pressure sensor 1013, an optical sensor 1014, and a proximity sensor 1015.

Those skilled in the art will appreciate that the structure shown in FIG. 10 does not constitute a limitation to the terminal 1000, the terminal 1000 may include more or less components than those shown in the figure, or some components are combined, or a different component arrangement is adopted.

Figure 11:
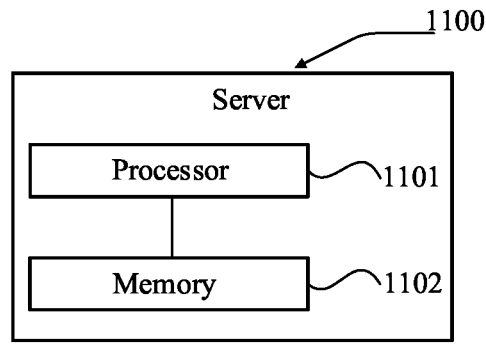
FIG. 11 is a schematic structural diagram of a server according to an embodiment of this application.

In a possible implementation, the computer device is provided as a server. FIG. 11 is a schematic structural diagram of a server according to an embodiment of this application. A server 1100 may vary a lot due to different configurations or performance, and may include one or more central processing units (CPUs) 1101 and one or more memories 1102. The memory 1102 stores at least one segment of computer program that, when loaded and executed by the CPU 1101, implements the method according to the foregoing method embodiments. Certainly, the server may further include components, such as a wired or wireless network interface, a keyboard, and an input/output interface, to facilitate input and output. The server may further include other components configured to implement functions of the device, which are not described in detail here.

The embodiments of this application further provide a non-transitory computer-readable storage medium, which stores at least one segment of computer program that, when loaded and executed by a processor, implements operations performed in the image classification method according to the foregoing embodiments.

The embodiments of this application further provide a computer program product, which includes a computer program that, when executed by a processor, implements operations performed in the image classification method according to the foregoing aspect.

Those of ordinary skill in the art will appreciate that all or some of the steps of the foregoing embodiments may be implemented by hardware, or may be implemented by a program instructing relevant hardware. The program may be stored in one computer-readable storage medium. The foregoing storage medium may be a read-only memory, a magnetic disk, an optical disc, or the like.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules. Moreover, each module or unit can be part of an overall module or unit that includes the functionalities of the module or unit. The foregoing descriptions are merely exemplary embodiments of the embodiments of this application, but are not intended to limit the embodiments of this application. Any modification, equivalent replacement, or improvement made within the spirit and principle of the embodiments of this application shall fall within the scope of protection of the embodiments of this application.

What is claimed is:

1. An image classification method, performed by a computer device and comprising:
   acquiring an image feature of a pathological image, further including:
   segmenting the pathological image at multiple scales, each scale having a multiple sub-images and each sub-image having a respective position in the pathological image;

performing feature extraction on each sub-image to obtain an image feature of the sub-image; and splicing the image features of the multiple sub-images corresponding to one scale based on positions of the multiple sub-images in the pathological image to obtain the image feature of the pathological image at the scale;

extracting, for each scale in the multiple scales, multiple local features corresponding to the scale from the image feature of the pathological image at the scale, wherein each local feature comprises second sub-features of the sub-images having the same scale at multiple positions of the pathological image;

splicing the local features respectively corresponding to the scales to obtain a spliced image feature, further including:

for each scale:

splicing the second sub-features in the multiple extracted local features corresponding to the scale to obtain a first feature vector for each sub-image corresponding to the scale:

updating the first feature vector to obtain a second feature vector for the sub-image corresponding to the scale;

constructing a three-dimensional feature matrix using the multiple second feature vectors of sub-images corresponding to the scale based on positions of the multiple local features in the image feature having the same scale as an aggregated feature corresponding to the scale; and splicing the multiple aggregated features respectively corresponding to the scales to obtain the spliced image feature; and classifying the spliced image feature to obtain a category to which the pathological image belongs.

2. The method according to claim 1, wherein the spliced image feature comprises first sub-features at multiple positions; and the classifying the spliced image feature to obtain a category to which the pathological image belongs comprises:

updating each first sub-feature of the multiple first sub-features to obtain a first updated feature corresponding to the first sub-feature;

using the first updated features corresponding to the multiple first sub-features to constitute an updated spliced image feature based on positions of the multiple first sub-features in the spliced image feature; and classifying the updated spliced image feature to obtain the category to which the pathological image belongs.

3. The method according to claim 2, wherein each first updated feature is a vector; and the using the first updated features corresponding to the multiple first sub-features to constitute an updated spliced image feature based on positions of the multiple first sub-features in the spliced image feature comprises:

using the first updated features corresponding to the multiple first sub-features to constitute a three-dimensional feature matrix based on the positions of the multiple first sub-features in the spliced image feature as the updated spliced image feature.

4. The method according to claim 1, wherein the spliced image feature comprises first sub-features at multiple positions; and before the classifying the spliced image feature to obtain a category to which the pathological image belongs, the method further comprises:

fusing each first sub-feature with a corresponding position feature indicating a position of the first sub-feature in the spliced image feature to obtain a second updated feature corresponding to the first sub-feature; and using the second updated features to constitute an updated spliced image feature based on the positions of the multiple first sub-features in the spliced image feature.

5. The method according to claim 1, wherein the splicing the multiple aggregated features to obtain the spliced image feature comprises:

splicing features at the same position in the multiple aggregated features to obtain feature vectors corresponding to multiple positions; and using the feature vectors corresponding to multiple positions to constitute a three-dimensional feature matrix as the spliced image feature.

6. A computer device, comprising a processor and a memory, the memory storing at least one computer program that, when loaded and executed by the processor, causes the computer device to perform an image classification method including:

acquiring an image feature of a pathological image, further including:

segmenting the pathological image at multiple scales, each scale having a multiple sub-images and each sub-image having a respective position in the pathological image;

performing feature extraction on each sub-image to obtain an image feature of the sub-image; and splicing the image features of the multiple sub-images corresponding to one scale based on positions of the multiple sub-images in the pathological image to obtain the image feature of the pathological image at the scale;

extracting, for each scale in the multiple scales, multiple local features corresponding to the scale from the image feature of the pathological image at the scale, wherein each local feature comprises second sub-features of the sub-images having the same scale at multiple positions of the pathological image;

splicing the local features respectively corresponding to the scales to obtain a spliced image feature, further including:

for each scale:

splicing the second sub-features in the multiple extracted local features corresponding to the scale to obtain a first feature vector for each sub-image corresponding to the scale:

updating the first feature vector to obtain a second feature vector for the sub-image corresponding to the scale;

constructing a three-dimensional feature matrix using the multiple second feature vectors of sub-images corresponding to the scale based on positions of the multiple local features in the image feature having the same scale as an aggregated feature corresponding to the scale; and splicing the multiple aggregated features respectively corresponding to the scales to obtain the spliced image feature; and classifying the spliced image feature to obtain a category to which the pathological image belongs.

7. The computer device according to claim 6, wherein the spliced image feature comprises first sub-features at multiple positions; and the classifying the spliced image feature to obtain a category to which the pathological image belongs comprises:

updating each first sub-feature of the multiple first sub-features to obtain a first updated feature corresponding to the first sub-feature;
using the first updated features corresponding to the multiple first sub-features to constitute an updated spliced image feature based on positions of the multiple first sub-features in the spliced image feature; and
classifying the updated spliced image feature to obtain the category to which the pathological image belongs.

8. The computer device according to claim 7, wherein each first updated feature is a vector; and the using the first updated features corresponding to the multiple first sub-features to constitute an updated spliced image feature based on positions of the multiple first sub-features in the spliced image feature comprises:
using the first updated features corresponding to the multiple first sub-features to constitute a three-dimensional feature matrix based on the positions of the multiple first sub-features in the spliced image feature as the updated spliced image feature.

9. The computer device according to claim 6, wherein the spliced image feature comprises first sub-features at multiple positions; and before the classifying the spliced image feature to obtain a category to which the pathological image belongs, the method further comprises:
fusing each first sub-feature with a corresponding position feature indicating a position of the first sub-feature in the spliced image feature to obtain a second updated feature corresponding to the first sub-feature; and
using the second updated features to constitute an updated spliced image feature based on the positions of the multiple first sub-features in the spliced image feature.

10. The computer device according to claim 6, wherein the splicing the multiple aggregated features to obtain the spliced image feature comprises:
splicing features at the same position in the multiple aggregated features to obtain feature vectors corresponding to multiple positions; and
using the feature vectors corresponding to multiple positions to constitute a three-dimensional feature matrix as the spliced image feature.

11. A non-transitory computer-readable storage medium, storing at least one computer program that, when loaded and executed by a processor of a computer device, causes the computer device to perform an image classification method including:
acquiring an image feature of a pathological image, further including:
segmenting the pathological image at multiple scales, each scale having a multiple sub-images and each sub-image having a respective position in the pathological image;
performing feature extraction on each sub-image to obtain an image feature of the sub-image; and
splicing the image features of the multiple sub-images corresponding to one scale based on positions of the multiple sub-images in the pathological image to obtain the image feature of the pathological image at the scale;
extracting, for each scale in the multiple scales, multiple local features corresponding to the scale from the image feature of the pathological image at the scale, wherein each local feature comprises second sub-features of the sub-images having the same scale at multiple positions of the pathological image;
splicing the local features respectively corresponding to the scales to obtain a spliced image feature, further including:
for each scale:
splicing the second sub-features in the multiple extracted local features corresponding to the scale to obtain a first feature vector for each sub-image corresponding to the scale;
updating the first feature vector to obtain a second feature vector for the sub-image corresponding to the scale;
constructing a three-dimensional feature matrix using the multiple second feature vectors of sub-images corresponding to the scale based on positions of the multiple local features in the image feature having the same scale as an aggregated feature corresponding to the scale; and
splicing the multiple aggregated features respectively corresponding to the scales to obtain the spliced image feature; and
classifying the spliced image feature to obtain a category to which the pathological image belongs.

12. The non-transitory computer-readable storage medium according to claim 11, wherein the spliced image feature comprises first sub-features at multiple positions; and
the classifying the spliced image feature to obtain a category to which the pathological image belongs comprises:
updating each first sub-feature of the multiple first sub-features to obtain a first updated feature corresponding to the first sub-feature;
using the first updated features corresponding to the multiple first sub-features to constitute an updated spliced image feature based on positions of the multiple first sub-features in the spliced image feature; and
classifying the updated spliced image feature to obtain the category to which the pathological image belongs.

13. The non-transitory computer-readable storage medium according to claim 12, wherein each first updated feature is a vector; and the using the first updated features corresponding to the multiple first sub-features to constitute an updated spliced image feature based on positions of the multiple first sub-features in the spliced image feature comprises:
using the first updated features corresponding to the multiple first sub-features to constitute a three-dimensional feature matrix based on the positions of the multiple first sub-features in the spliced image feature as the updated spliced image feature.

14. The non-transitory computer-readable storage medium according to claim 11, wherein the spliced image feature comprises first sub-features at multiple positions; and
before the classifying the spliced image feature to obtain a category to which the pathological image belongs, the method further comprises:
fusing each first sub-feature with a corresponding position feature indicating a position of the first sub-feature in the spliced image feature to obtain a second updated feature corresponding to the first sub-feature; and
using the second updated features to constitute an updated spliced image feature based on the positions of the multiple first sub-features in the spliced image feature.

15. The non-transitory computer-readable storage medium according to claim 11, wherein the splicing the multiple aggregated features to obtain the spliced image feature comprises:
   splicing features at the same position in the multiple aggregated features to obtain feature vectors corresponding to multiple positions; and
   using the feature vectors corresponding to multiple positions to constitute a three-dimensional feature matrix as the spliced image feature.

* * * * *